United States Patent [19]
Kanterakis et al.

[11] Patent Number: 5,757,791
[45] Date of Patent: May 26, 1998

[54] MULTISTAGE LINEAR RECEIVER FOR DS-CDMA SYSTEMS

[75] Inventors: Emmanuel Kanterakis, North Brunswick, N.J.; Shimon Moshavi, New York, N.Y.

[73] Assignee: American Wireless Technology, Inc., North Brunswick, N.J.

[21] Appl. No.: 634,160

[22] Filed: Apr. 18, 1996

[51] Int. Cl.$^6$ .................................................. H04J 13/02
[52] U.S. Cl. ........................................ 370/342; 375/206
[58] Field of Search .................................. 370/342, 335, 370/441, 389, 241, 320, 350, 503, 479; 375/200, 205, 206, 208, 209, 210

[56] References Cited

U.S. PATENT DOCUMENTS

| | | | |
|---|---|---|---|
| 4,653,069 | 3/1987 | Roeder | 380/31 |
| 4,672,629 | 6/1987 | Beier | 375/1 |
| 4,675,839 | 6/1987 | Kerr | 364/821 |
| 4,894,842 | 1/1990 | Broekhoven et al. | 375/1 |
| 5,081,643 | 1/1992 | Schilling | 375/1 |
| 5,103,459 | 4/1992 | Gilhousen et al. | 375/205 |
| 5,109,390 | 4/1992 | Gilhousen et al. | 375/1 |
| 5,297,162 | 3/1994 | Lee et al. | 375/205 |

OTHER PUBLICATIONS

Masahavi, Shimon, Kanterakis, Emmanuel G., and Schilling, Donable, "Multistage Linear Receivers fo DS–CDMA Systems", International Journal of Wireless Information Networks, vol. 3, No. 1, 1996, pp. 1–17.

Primary Examiner—Dang Ton
Attorney, Agent, or Firm—Suzin C. Bailey; David B. Newman, Jr.

[57] ABSTRACT

A multistage linear receiver for extracting data embedded in a received spread-spectrum signal having a plurality of channels using a direct sequence code division multiple access system. The multistage receiver comprises an initial plurality of spread-spectrum detectors, a plurality of detector weighting devices, a first plurality of product devices, a first combiner, a first plurality of spread-spectrum detectors, a first plurality of weight-product devices and an output combiner. The initial plurality of spread-spectrum detectors despreads and delays the plurality of channels to generate a plurality of detector-output signals. The detector weighting devices weight the plurality of detector-output signals with a plurality of detector weights as a plurality of weighted-detector signals. The plurality of detector-output signals are spread-spectrum processed by the first plurality of product devices to generate a first plurality of spread-spectrum signals which are combined by the first combiner as a first combined signal. The first plurality of spread-spectrum detectors despreads and delays the first combined signal as a first plurality of despread-combined signals which are weighted by the first plurality of weight-product devices to generate a first plurality of weighted signals. The output combiner combines the first plurality of weighted signals and the plurality of weighted-detector signals to extract the data. Additional stages comprising product devices, combiners and weight-product devices may be added as necessary or desired.

32 Claims, 12 Drawing Sheets

MULTISTAGE LINEAR RECEIVER FOR DS-CDMA SYSTEMS

BACKGROUND OF THE INVENTION

This invention relates to spread-spectrum communications, and more particularly to a receiver having multiple stages of spread-spectrum processors (e.g., product devices) and detectors, for reducing interference in a received spread-spectrum signal having multiple channels.

DESCRIPTION OF THE RELEVANT ART

Direct sequence code division multiple access (DS-CDMA) spread-spectrum systems are a popular choice for use in cellular and personal communications. The attractive properties of these systems include resistance to multipath fading, natural usage of the voice activity cycle, soft handoffs between base stations, jam resistance, and frequency reuse. Frequency reuse, more particularly, translates into potentially significant capacity increases over conventional systems. In addition, in a multipath environment, the use of RAKE receivers enables the harnessing of the total received energy.

The conventional approach to detecting DS-CDMA signals includes using a bank of single-user, matched filter receivers. The received DS-CDMA spread-spectrum signal is separately correlated with each user's synchronized chip-sequence signal. While this approach is relatively easy to implement, its performance is limited by the multiple access interference (MAI) that results from the nonzero cross-correlations which exist between users. Multiple access interference is the most significant limiting factor of user capacity in conventional DS-CDMA channels. The near-far effect further exacerbates the MAI problem, but is mostly mitigated by the use of adaptive power control (APC).

The expanding demands for wireless communications have promoted a need to find new detection schemes for DS-CDMA spread-spectrum signals that are less limited by multiple access interference and thus able to support more users. The systems incorporating such new detection schemes also would allow more flexibility to provide different quality of service options by simply raising the transmitted power.

SUMMARY OF THE INVENTION

A general object of the invention is to mitigate the effect of multiple access interference in a direct sequence code division multiple access (DS-CDMA) receiver.

According to the present invention, as embodied and broadly described herein, a family of multistage low-complexity linear receivers for DS-CDMA spread-spectrum communications is provided. The multistage-linear receiver mitigates the effect of multiple access interference by employing joint detection of multiple users and therefore requires knowledge of the signature chip-sequence signals and their timing. In addition, for multipath environments, reliable estimates of the received powers and phases are assumed available for maximal ratio RAKE combining.

Each stage of the multistage linear receiver recreates the overall modulation, noiseless channel, and demodulation process. The outputs of these stages are then linearly combined. The combining weights may be chosen to implement different linear detectors, including the decorrelating and minimum means squared error (MMSE) detectors.

More particularly, the present invention provides a multistage-linear receiver, i.e., a linear receiver having multiple stages, for extracting data embedded in a received-spread-spectrum signal, using direct sequence, in a code division multiple access spread-spectrum system. The received spread-spectrum signal has a plurality of channels, with each channel generated by a chip-sequence signal different from the chip-sequence signals of the other channels of the plurality of channels.

The multistage-linear receiver comprises an initial plurality of spread-spectrum detectors, detector-weighting means, a first plurality of product devices, a first combiner, a first plurality of spread-spectrum detectors, first weight means, and an output combiner. The initial plurality of spread-spectrum detectors despreads from the received DS-CDMA spread-spectrum signal the plurality of channels embedded in the received-spread-spectrum signal, to generate at the output of the initial plurality of spread-spectrum detectors, a plurality of detector-output signals, respectively. Thus, each despread channel in the received spread-spectrum signal becomes a detector-output signal.

The detector-weighting means weights the plurality of detector-output signals with a plurality of detector weights. The weighted plurality of detector-output signals become a plurality of weighted-detector signals, respectively.

The first plurality of product devices spread-spectrum processes the plurality of detector-output signals with a replica of the plurality of chip-sequence signals of the plurality of channels. The first plurality of product devices thus generates a first plurality of spread-spectrum signals, respect The first combiner combines the first plurality of spread-spectrum signals, and outputs the combined first plurality of spread-spectrum signals as a first combined signal. The first plurality of spread-spectrum detectors despreads the first combined signal, and the results are outputted as a first plurality of despread-combined signals.

The first plurality of weight means weights the first plurality of despread-combined signals with a first plurality of weights. This generates a first plurality of weighted signals, respectively.

The output combiner combines the plurality of weighted-detector signals and the first plurality of weighted signals to extract the data.

When the plurality of detector weights are kept equal and the plurality of first weights are kept equal they may be determined from the algorithm $$w = \left\{ \sum_{j=-L}^{L} S_j^* S_j \right\}^{-1} \left\{ \sum_{j=-L}^{L} S_j^* d_j \right\}$$

where: w is a two element vector of the detector weight and the first weight; $S_j$ is a matrix of the plurality of detector-output signals and the first plurality of despread-combined signals, $\{\ \}^{-1}$ indicates an inverse of $\{\ \}$ and * indicates complex conjugate transpose; and $d_j$ is a vector of data which generated the plurality of detector-output signals and the first plurality of despread-combined signals.

Additional stages may be added to the multistage linear receiver to improve performance. To add a second stage, the multistage linear receiver would include a second plurality of product devices, a second combiner and a second plurality of spread-spectrum detectors. The present invention also may be a method embodied in an application specific integrated circuit (ASIC), or equivalent circuits.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DESCRIPTION OF THE PREFERRED EMBODIMENTS

Reference now is made in detail to the present preferred embodiments of the invention, examples of which are illustrated in the accompanying drawings.

The present invention provides a novel multistage linear receiver structure that can efficiently implement different linear detectors, including decorrelating and minimum mean square error (MMSE) detectors. The multistage linear receiver may be used to approximate a desired inverse matrix by a polynomial expansion in R. This expansion is formed by linearly combining the outputs of the individual receiver stages.

The multistage linear receiver may be implemented in a digital signal processor, in an application specific integrated circuit (ASIC), or in discrete components, as is well known in the art. The implementations of the multistage linear receiver may be analog or digital.

Figure 1A:
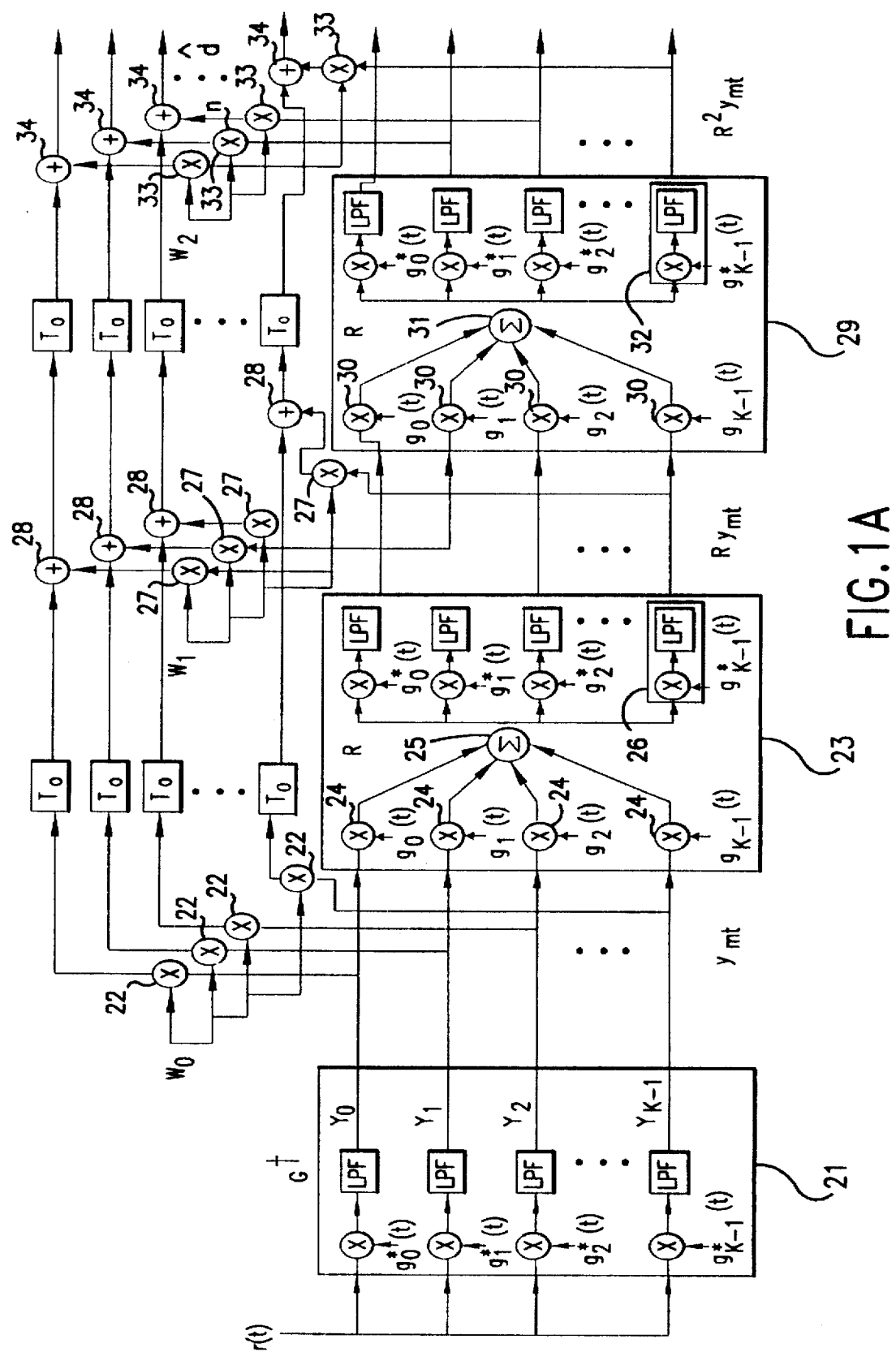
FIG. 1A is a block diagram of the multistage linear receiver, showing two stages.

The simulation results of the present invention are focused, by way of example, on a system employing binary phase shift keying (BPSK) modulation and single path channels. The simulation results presented herein are based on a receiver implementation as shown in FIG. 1A. Significant gains in potential probability of error performance can be obtained over conventional direct sequence code division multiple access (DS-CDMA) detection.

The multistage linear receiver extracts data embedded in a received DS-CDMA spread-spectrum signal. The spread-spectrum signal has a plurality of channels, with each channel generated from a chip-sequence signal different from the chip-sequence signals used by the other channels. This is a typical DS-CDMA spread-spectrum signal, as is well known in the art.

Figure 1B:
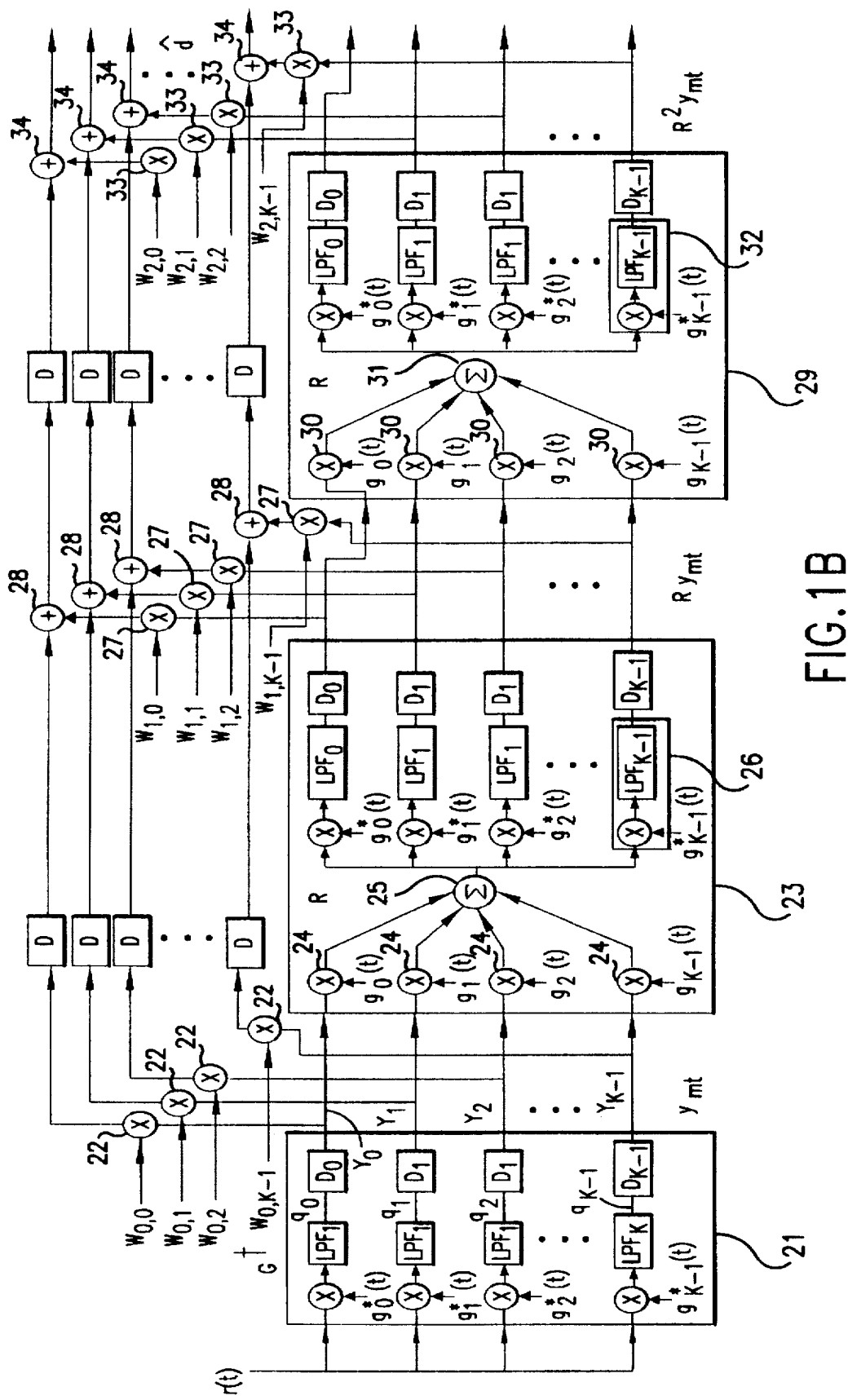
FIG. 1B is a block diagram of the variable data rate multistage linear receiver showing two stages.

As shown in FIG. 1B, the multistage linear receiver comprises despreader-delay means, detector-weighting means, first stage means, first weight means, and output-combiner means. The detector-weighting means is coupled to the despreader-delay means, and the first stage is coupled to the despreader-delay means. The first weight means is coupled to the first stage means and the output-combiner means is coupled to the detector-weighting means and to the first weight means.

The despreader-delay means despreads and delays the plurality of channels embedded in the received DS-CDMA spread-spectrum signal. The despreader-delay means may be embodied as a plurality of correlators, as a plurality of matched filters, or as a plurality of surface-acoustic-wave (SAW) devices, for despreading each of the plurality of channels in the received DS-CDMA spread-spectrum signal, followed by a plurality of delay devices. The output of the despreader-delay means is a plurality of detector-output signals, with a detector-output signal corresponding to each of the channels of the plurality of channels.

The detector-weighting means weights the plurality of detector-output signals with a plurality of detector weights. For a digital implementation, the plurality of detector weights is a set of numbers that may be determined by an algorithm, discussed herein. Each of the plurality of detector output signals may be multiplied by a different detector weight or by the same detector weight. For an analog implementation, the detector weights are the gains of amplifiers. Each of the plurality of detector-output signals may be amplified by different gain.

The output of the detector-weighting means is a plurality of weighted-detector signals, with each signal weighted by a detector weight.

The first stage means spread-spectrum processes the plurality of detector-output signals with a replica of the plurality of chip-sequence signals corresponding to the plurality of channels to generate a first plurality of spread-spectrum signals. The spread-spectrum processing may be accomplished using product devices, matched filters or SAW devices, which are well known in the art for generating spread-spectrum signals. At the output of spread-spectrum processing is a plurality of channels defined by their respective chip-sequence signals.

The first stage means combines the first plurality of spread-spectrum signals as a first combined signal, and then despreads the first combined signal as a first plurality of despread-combined signals. The first stage means may include, for combining, a combiner and for despreading, may be embodied as a plurality of product devices, a product devices and lowpass filters, a plurality of matched filters, a plurality of SAW devices, or other electronic circuitry which is known in the art for despreading the spread-spectrum signal.

The first weight means weights the first plurality of despread-combined signals with a plurality of first weights. Each weight of the first plurality of weights may have the same value, or different value, as the other weights of the first plurality of weights. How these weights are determined is discussed infra. This plurality of first weights can be implemented digitally by multiplying each of the plurality of delayed-despread-combined signals by the plurality of first weights. The plurality of first weights is a set of numbers which may be determined by an algorithm, discussed herein. The plurality of first weights alternatively may be gains of amplifiers, for an analog implementation.

At the output of the first weight means is a first plurality of weighted signals, with a particular weighted signal of the plurality of weighted-signals corresponding to one of the plurality of delayed-despread-combined signals.

The output-combiner means combines the plurality of weighted-detector signals and the first plurality of weighted signals, respectively, to extract the data.

When the plurality of spread spectrum signals have identical processing gains, the multistage linear receiver, as shown in FIG. 1A, may determine the detector weight and the first weight, for minimum mean square error, from the algorithm, $$w = \left\{ \sum_{j=-L}^{L} S_j^* S_j \right\}^{-1} \left\{ \sum_{j=-L}^{L} S_j^* d_j \right\}$$

where: $w$ is a vector of the detector weight and the first weight; $S_j$ is a matrix of the plurality of detector-output signals and the first plurality of despread-combined signals; $\{\ \}^{-1}$ indicates an inverse of $\{\ \}$ and $*$ indicates complex conjugate transpose; and $d_j$ is a vector of data which generated the plurality of detector-output signals and the first plurality of despread-combined signals.

This is one algorithm for computing the weights $w$. Any set of weights which approximately satisfy $$\sum_{i=0}^{N_s} w_i \lambda_j^i = \frac{1}{\lambda_j + N_0}$$

can also be used. Here $N_s$ is the number of stages $\lambda_j$ are the eigenvalues of R (to be defined herein) and $N_O$ is the power spectral density of the background noise.

The weights, for a system where all spread-spectrum channels have the same processing gain, may be obtained by approximating the expression $$\sum_{i=0}^{N_s} w_i R^i = \{R + N_0 I\}^{-1}$$

for the system to approximate an MMSE detector.

Many other methods can also be derived to perform the above approximation. For example, setting the function $$p(\lambda_j) = \sum_{i=0}^{N_s} w_i \lambda_j^i = \frac{1}{\lambda_j + N_0},$$

$p(\lambda_j)$ need to approximate $1/(\lambda_j+N_O)$ for all eigenvalues, of R. If the region where the $\lambda_j$'s reside is known, then a reasonable set of weights can be computed using some error minimization approach. A somewhat general algorithm may be formed if the error $$\epsilon_w = \sum_{j=0}^{NK-1} h(\lambda_j, N_0) \left\{ \sum_{i=0}^{N_s} w_i \lambda_j^i - \frac{1}{\lambda_j + N_0} \right\}^2$$

is minimized for some appropriate $h(\lambda_j, N_o)$ function. An example of $h(\lambda_j, N_O)$ would be $$h(\lambda_j, N_O)=(\lambda_j^2+N_O\lambda_j)$$

In general, if the receiver knows the transmitted codes, their timing and the channel behavior, a "good" set of weights can always be computed.

However, even in the case where there is no knowledge of any system parameters (such as codes, timing, channel state, etc.,) a "reasonable" set of weights can be computed by approximating the function $$\sum_{i=0}^{N_s} w_i \lambda^i = \frac{1}{\lambda + N_0}$$

over a $\lambda$ region of interest. These values also may be determined by computer search, instead of calculating per the algorithm.

A person skilled in the art would come up with a great variety of ways for computing reasonable sets of weights. Furthermore, weights computed for a system as shown in FIG. 1A can also be used in FIG. 1B. The weight selection for the system described in FIG. 1B can be optimized by selecting the weights per spread-spectrum channel according to the load, number of channels divided by the system's processing gain, the system experiences. Applying this loading to the system in FIG. 1A produces a set of weights that can be used for that particular channel in FIG. 1B.

The multistage linear receiver may further comprise second stage means. The second stage means is coupled to the first stage means. The second stage means spread-spectrum processes the first plurality of despread-combined signals from the first stage means, with the plurality of chip-sequence signals of the plurality of channels. The second stage means thus generates a second plurality of spread-spectrum signals, respectively. The second plurality of spread-spectrum signals are combined as a second combined signal, and the second stage means despreads and delays the second combined signal as a second plurality of delayed-despread-combined signals. The spread-spectrum processing, combining and despreading in the second stage means may be implemented in a manner similar to that used in the first stage means.

The multistage linear receiver with second stage means also would include a second means coupled to the second stage means. The second weight means weights the second plurality of delayed-despread-combined signals with a second plurality of weights to generate a second plurality of weighted signals. Each weight of the second plurality of weights may have the same value, or different value, as the other weights of the second plurality of weights.

The output-combiner means also is coupled to the second weight means, and combines the plurality of weighted-detected signals, the first plurality of weighted signals and the second plurality of weighted signals, to extract the data. In this case, the plurality of detector weights, the first plurality of weights and the second plurality of weights can be determined from any of the foregoing algorithms where w is a vector of the detector weights, the first plurality of weights and the second plurality of weights; $S_j$ is a matrix of the plurality of detector-output signals, the first plurality of delayed-despread-combined signals and the second plurality of delayed-despread-combined signals; and $d_j$ is a vector of data which generated the plurality of detector-output signals, the first plurality of delayed-despread-combined signals and the second plurality of delayed-despread-combined signals.

The multistage linear receiver may have multiple stages beyond that of the first stage means and the second stage means, as a system requires. It would be clear to a person skilled in the art, from the foregoing teaching, how to expand the multistage linear receiver to the desired number of stages.

The following discussion shows, by way of example, the multistage linear receiver for fixed data rate systems, i.e., with the spread spectrum channels utilize the same processing gain, in FIG. 1A and the multistage linear receiver, for variable data rate, i.e., with different spread spectrum channels can use different processing gains, in FIG. 1B.

In the exemplary arrangement shown in FIGS. 1A and 1B, the despreader means is shown as an initial plurality of spread-spectrum detectors 21. The initial plurality of spread-spectrum detectors despreads the plurality of channels embedded in the received DS-CDMA spread-spectrum signal. At the output of the initial plurality of spread-spectrum detectors is a plurality of detector-output signals. The plurality of detector-output signals corresponds to the plurality of channels, respectively, embedded in the received DS-CDMA spread-spectrum signal.

The detector weight means is embodied as a plurality of detector-product devices 22, with each detector-product device coupled to one of the spread-spectrum detectors of the initial plurality of spread-spectrum detectors 21. Each of the detector-product devices multiplies the plurality of detector-output signals with detector weights, to generate a weighted-detector signal.

As shown in FIGS. 1A and 1B, the first stage 23 includes a first plurality of product devices 24, a first combiner 25, and a first plurality of spread-spectrum detectors 26. The first combiner 25 is coupled to the first plurality of product devices 24, and the output of the first combiner 25 is coupled to the first plurality of spread-spectrum detectors 26.

The output of the initial plurality of spread-spectrum detectors 21 is coupled to a first plurality of product devices 24. The first plurality of product devices 24 spread-spectrum processes the plurality of detector-output signals with the plurality of chip-sequence signals of the plurality of channels. The spread-spectrum processing generates a first plurality of spread-spectrum signals.

By way of example, while a chip-sequence signal $PN_o(t)$ may have been transmitted by the spread-spectrum transmitter which originated the DS-CDMA spread-spectrum signal, this chip-sequence signal may go through multipath having different attenuations $x_i$ and delays $\tau_i$. Thus, the received chip-sequence signal $g_o(t)$ would have the form:

$$g_o(t) = \sum_i x_i PN_o(t - \tau_i)$$

Thus, $g_o(t)$ is the received chip-sequence signal, which is a modified form of the original chip-sequence signal.

The first combiner 25 combines the first plurality of spread-spectrum signals as a first combined signal. The first plurality of spread-spectrum detectors 26 despreads the first combined signal as a first plurality of despread-combined signals.

The first weight means is embodied as a first plurality of weight-product devices 27. The first plurality of weight-product devices 27 is coupled to the first plurality of spread-spectrum detectors 26. The first plurality of weight-product devices 27 weights the first plurality of despread-combined signals with a plurality of first weights, to generate a first plurality of weighted signals. This can be accomplished digitally by factoring the plurality of first weights with the first plurality of despread-combined signals.

The output-combiner means is embodied as an output combiner 28. The output combiner is coupled to the detector-weighting device 22 through a plurality of delays and to the first weight-product device 27. In the case all channels operate on the same bit rate, i.e., identical processing gains as in FIG. 1A, these delays equal a bit duration. $T_b$ is the time duration of a bit. In the case different spread spectrum channels operate using different processing gains, the detector outputs need to be delayed, as shown in FIG. 1B, so that the delay introduced by the low pass filter $LPF_i$ and delay $D_i$ combination is constant equal to D and independent of i. The output combiner 28 combines the plurality of weighted-detector signals and the first plurality of weighted signals, with appropriate delays, $T_b$, to extract the data.

Additional stages may be added. For a second stage, as shown in FIGS. 1A and 1B, the second stage 29 includes a second plurality of product devices 30, a second combiner 31 and a second plurality of spread-spectrum detectors 32. The second combiner 31 is coupled between the second plurality of product devices 30 and the second plurality of spread-spectrum detectors 32.

For the second stage, the second plurality of product devices 30 is coupled also to the first plurality of spread-spectrum detectors 26. The second plurality of product devices 30 spread-spectrum processes the first plurality of despread-combined signals with the plurality of chip-sequence signals of the plurality of channels. This generates a second plurality of spread-spectrum signals, respectively. The second combiner 31 combines the second plurality of spread-spectrum signals as a second combined signal.

The second plurality of spread-spectrum detectors 32 despreads the second combined signal as a second plurality of despread-combined signals.

For a second stage, second weight means would be embodied as a second plurality of weight-product devices 33 coupled to the second plurality of spread-spectrum detectors 32, respectively. The second plurality of weight-product devices 33 weights the second plurality of despread-combined signals with a plurality of second weights, to generate a second plurality of weighted signals.

The output combiner 34, which is coupled to the second plurality of weight-product devices 27, combines the plurality of weight-detector signals, the first plurality of weighted signals, and the second plurality of weighted signals, to extract the data.

Third, fourth, fifth, etc. stages may be added in a similar fashion. Each plurality of weights for each stage, depends on the chip-sequence signal and channel behavior.

The present invention also includes a method for extracting data embedded in a received direct sequence code division multiple access (DS-CDMA) spread-spectrum signal. The received DS-CDMA spread-spectrum signal has a plurality of channels with each channel having a chip-sequence signal different from the chip-sequence signals of the other channels. The method comprises the steps of despreading the plurality of channels embedded in the received DS-CDMA spread-spectrum signal as a plurality of detector-output signals, respectively. The plurality of detector-output signals are weighted with a detector weight to generate a respective plurality of weighted-detector signals.

The method subsequently spread-spectrum processes the plurality of detector-output signals with the plurality of chip-sequence signals of the plurality of channels, as a first plurality of spread-spectrum signals, respectively, combines the first plurality of spread-spectrum signals as a first combined signal, and despreads the first combined signal as a first plurality of despread-combined signals. The first plurality of despread-combined signals are weighted with a plurality of first weights to generate a first plurality of weighted signals. The plurality of weighted-detector signals and the first plurality of weighted signals, respectively, are combined to extract the data.

The method can be expanded to multiple stages. In such a case, each of the stages includes the steps of spread-spectrum processing, with the plurality of chip-sequence signals of the plurality of channels, the plurality of despread-combined signals from the previous $n^{th}$ stage to generate an $n^{th}$ plurality of spread-spectrum signals, respectively; combining the $n^{th}$ plurality of spread-spectrum signals as an $n^{th}$ combined signal; despreading the $n^{th}$ combined signal as $n^{th}$ plurality of despread-combined signals, which appear at the output of the stage; weighting the $n^{th}$ plurality of despread-combined signals with a plurality of weights to generate an $n^{th}$ plurality of weighted signals, respectively; and combining the plurality of weighted-detector signals, the first plurality of weighted signals and the $n^{th}$ plurality of weighted signals, respectively, to extract the data.

The plurality of detector weights, the first plurality of weights and the $n^{th}$ plurality of weights can be determined from, but not limited to, the previous algorithms.

Communication System Model

By way of example, and assuming there are K users all transmitting DS-QAM signals to a single receiver, the received signal can be written in the complex baseband form $$r(t) = \sum_{k=0}^{K-1} \sum_{m=0}^{M} \sqrt{P_{k,m}(t)} \, e^{j\phi_{k,m}(t)} m_k(t - \tau_{k,m}(t)) PN_k(t - \tau_{k,m}(t)) + n(t)$$

where $P_{k,m}(t)$ is the received power due to the $m^{th}$ multipath of the $k_{th}$ user, $\phi_{k,m}(t)$ is the rotation angle of the same signal imposed by the channel, $$m_k(t) = \sum_{i=-L}^{L} d_{k,i} \, p_k(t - iT_{b,k})$$

is the modulation with $d_{k,i}$ taking on complex values corresponding to the transmitted data and unit amplitude rectangular pulse shape $p_k(t)$ of duration $T_{b,k}$. $\tau_{k,m}(t)$ is the delay, $$PN_k(t) = \sum_{i=-\infty}^{\infty} c_{i,k} \psi(t - iT_c)$$

is the spreading PN code with $c_{i,k}$ assumed random ±1 and $\psi(t)$ unit amplitude chip pulses of duration $T_c$. The noise n(t) is assumed to be additive white Gaussian noise with single-sided power spectral density of $N_O$ W/Hz. The ratio $T_{b,k}/T_c$ is normally defined as the processing gain, $PG_k$ of the $k^{th}$ user. The system as described here allows for users to have different processing gains, allowing for variable data rate transmissions.

The signal r(t) after being filtered and sampled at the Nyquist rate can be written in the matrix form $$r = \left\{ \sum_{m=0}^{M} C_m W_m^{1/2} \right\} d + n = Gd + n.$$

The length of the vector r, taken to be equal to 2N+1, depends on the signal bandwidth and the total message transmission time interval. The data vector d holds as elements all the bits transmitted by all users in some convenient order. In general, d is given by $$d = \begin{pmatrix} d_{-L} \\ \vdots \\ d_{-1} \\ d_0 \\ d_1 \\ \vdots \\ d_L \end{pmatrix} \quad \text{where } d_i = \begin{pmatrix} d_{0,i} \\ d_{1,i} \\ d_{2,i} \\ \vdots \\ d_{K-1,i} \end{pmatrix}$$

is a vector that contains the $i^{th}$ transmitted bit of all users. The matrices $C_m$, m=0, ..., M hold the spreading codes of all bits of all the users received from the $m^{th}$ multipath. The structure of the $C_m$ matrices depend on the particular multipath environment during the message transmission. In general, a matrix $C_m$ will have the form $$C_m = \begin{pmatrix} (C_{-L,m}) & & & 0 \\ & \ddots & & \\ & & (C_{0,m}) & \\ & & & \ddots \\ 0 & & & (C_{L,m}) \end{pmatrix}$$

where all the entries outside the submatrices are equal to zero. The columns of the submatrices $C_{i,m}$ are the codes used for spreading the $i^{th}$ bit of each user. The substructure of $C_{i,m}$ can be represented as $$C_{i,m} = \begin{pmatrix} (c_{i,m,0}) & & & 0 \\ & (c_{i,m,1}) & & \\ & & \ddots & \\ 0 & & & (c_{i,m,K-1}) \end{pmatrix}$$

where the vectors $C_{i,m,k}$ are the code vectors associated with the $i^{th}$ bit of the $k^{th}$ user received over the $m^{th}$ multipath.

For analytical convenience, the received power from each user is assumed relatively constant over the duration of a single bit. The matrices $$W_m^{1/2}, m=0,1,\ldots,M,$$

are structured in the simple diagonal form $$W_m^{1/2} = \begin{pmatrix} W_{-L,m}^{1/2} & & & 0 \\ & \ddots & & \\ & & W_{0,m}^{1/2} & \\ & & & \ddots \\ 0 & & & W_{L,m}^{1/2} \end{pmatrix}$$

where the diagonal submatrices $$W_{i,m}^{1/2}$$

hold the complex gains of all users associated with the $i^{th}$ bit and the $m^{th}$ multipath. These complex gains correspond to the coefficients $$\sqrt{P_{k,m}(t)}\, e^{j\phi_{k,m}(t)}$$

of $r(t)$.

The expression of R depicts the real situation where copies of the same bit undergo different magnitude and phase rotations before being summed at the receiver. Analytically, the formulation of the received signal could be structured such that the bits received from different multipath components were treated as being received from different users. The soft estimates of bits received from the same user could then be combined in some optimum fashion.

The maximum likelihood detector decides on the transmitted data vector by maximizing the log-likelihood function $$L=2R\{d^*y_{mf}\}-d^*Rd,$$

where $R\{x\}$ denotes the real part of x, the superscript * denotes conjugate transpose, $y_{mf}$ is the matched filter output vector given by $$y_{mf}=G^*r=Rd+G^*n.$$

The vector $y_{mf}$ as defined above, is in fact the output of a RAKE receiver which is matched to the waveforms received from all users. The vector $y_{mf}$ represents a vector of sufficient statistics and can be used for optimum detection of the received data. The matrix R is a $(2L+1)K \times (2L+1)K$ cross-correlation matrix defined as $$R = G^*G = \sum_{m_1=0}^{M}\sum_{m_2=0}^{M}(W_{m_1}^{1/2})^* C^*_{m_1} C_{m_2} W_{m_2}^{1/2}$$

$$= \sum_{m_1=0}^{M}\sum_{m_2=0}^{M}(W_{m_1}^{1/2})^* Q_{m_1,m_2} W_{m_2}^{1/2} = \sum_{m_1=0}^{M}\sum_{m_2=0}^{M} R_{m_1,m_2}.$$

A Class of Multistage Linear Receivers

A general class of multistage linear receivers can be obtained if the soft estimate of the $j^{th}$ bit of the $k^{th}$ user were produced by the expression $$d_{j,k}=\sum_{i=0}^{N_s} w_{j,k,i} R^i G^* r = \sum_{i=0}^{N_s} w_{j,k,i} R^i y_{mf}$$

where the weights $w_{j,k,i}$ for all j, k, i are computed as to optimize some system performance measure. The structure which implements the above estimator is shown in FIG. 1B. This estimator is very general and can be used to implement any linear receiver structure.

The delays $D_i$, i=0, 1, ..., K−1, shown in FIG. 1B, are used for making the delays through the detectors to the output of each stage equal. In other words, the delays introduced by the low filters $LPF_i$ and delays $D_i$ combinations, i=0, 1, ..., K−1, should be equal. The delay D equals the delay caused by a $LPF_i$ and $D_i$ combination.

A less general class of multistage linear receivers can be obtained if the soft estimate of d is produced by the expression $$\hat{d}=\sum_{i=0}^{N_s} w_i R^i G^* r = \sum_{i=0}^{N_s} w_i R^i y_{mf}$$

where the weights or coefficients $w_i$, i=0, 1, ..., $N_s$ can be used to optimize some system performance measure given R and the number of stages used. The structure which implements the above estimator is shown in FIG. 1A. The operation defined by R is identical to that performed by the modulator, the channel, and the matched filter receiver combined when there is no noise present. Thus, given the transmitted bits, the application of R recreates the noiseless outputs of the matched filter bank.

Simulation of the Invention

The simulation results presented in the following are based on FIG. 1A.

For both synchronous and asynchronous systems, where the codes differ for each bit, the average asymptotic efficiency of the $k^{th}$ user for the linear mapping L may be defined as $$\overline{\eta_k(L)} = \frac{1}{2L+1} \sum_{\substack{r=-L \\ i=k+rK}}^{L}$$

$$\max^2\left\{0, \frac{1}{\sqrt{q_i}} \frac{LR_{ii} - \Sigma_{j\neq i}|(LR)_{ij}|}{\sqrt{LRL^T)_{ii}}}\right\}$$

Figure 2:
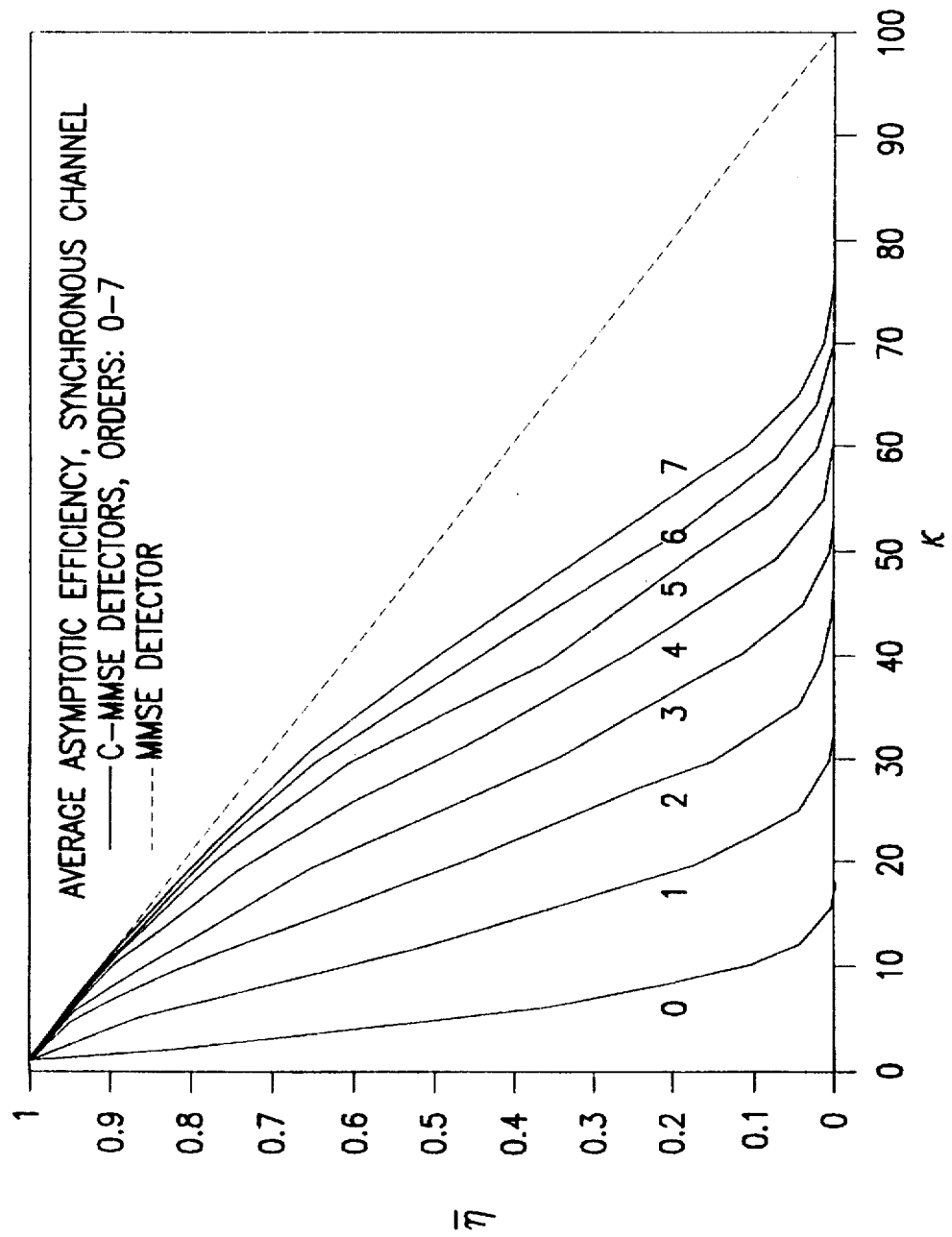
FIG. 2 is a diagram of average asymptotic efficiency of the C-MMSE detector as a function of the number of users, K, with the results given for a synchronous, equal power channel with a processing gain (PG) of 100, and with the number of stages ranging from 0 (conventional detector) to 7; the average asymptotic efficiency of the exact MMSE detector is also shown.

This equation is evaluated by Monte Carlo simulation for C-MMSE detectors of various numbers of stages, i.e., with $$L=L_{C-MMSE}=\Sigma_{i=0}^{N_s} w_i R^i$$

for a synchronous channel. It is much simpler to simulate the foregoing equation for a synchronous channel, since R is then block diagonal.

$$\overline{\eta_k(L_{C-MMSE})}$$

to be rewritten and evaluated in terms of the bitwise cross-correlation matrices. The results for C-MMSE detectors of up to seven stages are shown in FIG. 2 as a function of the number of users in the system. Here, PG=100 and all powers are equal. For comparison, results are also shown for the MMSE detector; these results are identical to that of the decorrelating detector, since $q_i \gg N_0/2$ for all i. See Z. Xie, R. T. Short, and C. K. Rushforth, "A Family of Suboptimum Detectors for Coherent Multiuser Communications," *IEEE Journal on Selected Areas of Communications*, Vol. 8, No. 4, pp. 683–690, 1990. Note that stage zero corresponds to the conventional matched filter detector. It can be seen that for $\bar{\eta}=0.1$, the conventional detector can support about ten users, while a seven-stage C-MMSE detector can support about 60 users. This translates to a sixfold increase in efficiency.

As can be seen from the following equations, $$p(\lambda_j) = \sum_{i=0}^{N_s} w_i \lambda_j^i = \frac{1}{\lambda_j + N_0}$$

$$p(\lambda_j) = \sum_{i=0}^{N_s} w_i \lambda_j^i = \frac{1}{\lambda_j + N_0/2}$$

for quadrature amplitude modulation (QAM) and binary phase shift keying (BPSK) signaling respectively, the C-MMSE coefficients depend on the eigenvalue distribution of R. The eigenvalue distribution is affected by the number of users in the system. For ease of analysis, the discussion herein is limited to synchronous channels.

Under this system condition, the matrix R is block diagonal. As used herein, a synchronous channel indicates bit, code, and carrier phase synchronization and a single signal path. As a result, R is real, and $R=R$. It may also be assumed that all users' signals are received at equal power, which is normalized to unity, setting all of the diagonal elements of R equal to one. Therefore, the trace of R equals its dimension, and the average value of the eigenvalues of R equals unity. This can be expressed as $$\bar{\lambda} = \frac{1}{NK} Tr\{R\} = \frac{1}{NK} \sum_{j=-L}^{L} Tr\{R_j\} = 1$$

where $R_j$, $j=-L, \ldots, L$ are the block diagonal submatrices of R. The variance of the eigenvalues of R is defined as $$\sigma_\lambda^2 = \frac{1}{NK} \sum_{k=0}^{NK-1} (\lambda_k - \bar{\lambda})^2 = \frac{1}{NK} \sum_{j=-L}^{L} Tr\{(R_j - I_k)^2\}$$

$$= \frac{1}{NK} \sum_{j=-L}^{L} \left\{ \sum_{k_1=0}^{k-1} \sum_{k_2=0}^{K-1} \{R_j(k_1, k_2)\}^2 \right\}_{k_2 \neq k_1}$$

where $I_K$ is the identity matrix of dimension K and $R_j(k_1, k_2)$ is the normalized cross-correlation between the codes of users $k_1$ and $k_2$ for symbol j. This term is a random variable that equals the average of PG random variables, each of which takes on the equally likely values of $\pm 1$. It is easy to show that its mean is zero and its variance is 1/PG. Therefore the previous equation reduces to $$\sigma_\lambda^2 = \frac{K-1}{PG}$$

As the number of users increases, with PG kept constant, $\sigma_\lambda^2$ increases. Because R is nonnegative definite, the eigenvalues are nonnegative. Therefore, since their average value is fixed at one, the larger their variance, the more they are forced to near or at zero. This in turn limits the extent to which R may be inverted without causing noise enhancement. In addition, a larger variance translates to a wider range of positive eigenvalues. This requires a higher order polynomial for a good approximation of the equation, $$p(\lambda_j) = \sum_{i=0}^{N_s} w_i \lambda_j^i = \frac{1}{\lambda_j + N_0/2}$$

Figure 3:
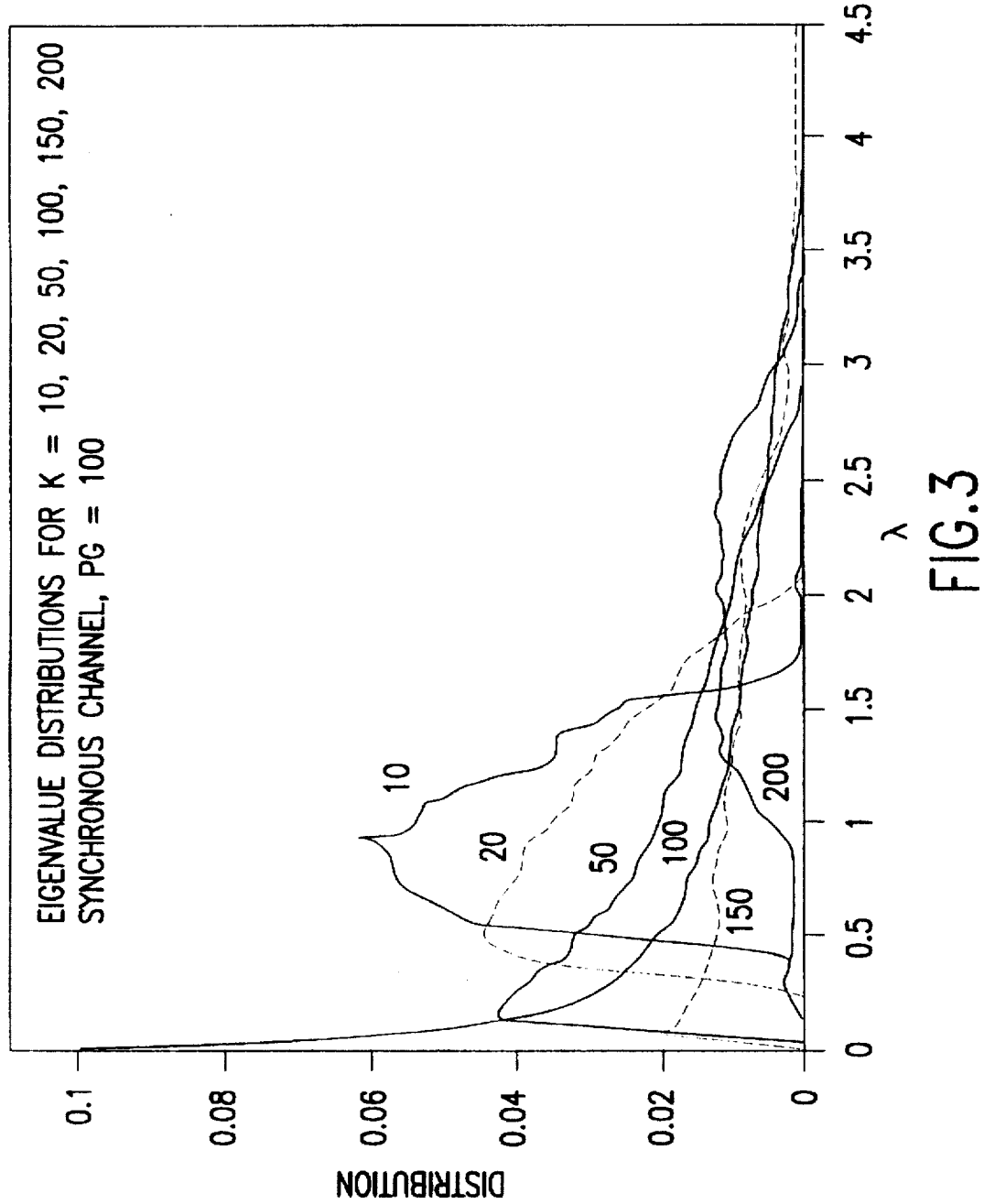
FIG. 3 is a diagram of envelopes of histograms of the eigenvalues of R for different values of the number of users K, with results shown for a synchronous, equal power channel with a processing gain of 100.

In FIG. 3, the envelopes of the eigenvalue histograms are plotted for PG=100 and K=(10, 20, 50, 100, 150, 200). The widening of the eigenvalue distribution is evident as K increases. The eigenvalue distribution changes from Gaussian (K=2) to a distribution resembling an exponential as K approaches the processing gain. For K above PG in a synchronous system, K−PG eigenvalues of each $R_j$ become identically equal to zero. That is, a delta function of weight 1−PG/K is formed at zero. It should also be noted that for the case when K>PG, the nonzero eigenvalues of R shift away from zero. This is due to the fact that the expected value of the nonzero eigenvalues increases above unity. This has a significant effect on the behavior of the decorrelating detector, since it provides a natural shift of the eigenvalues away from zero, as in the case of the MMSE detector.

Having determined that the number of users in the system affects the eigenvalue distribution of R, it can be seen from the following equations that there is a resulting effect on the C-MMSE coefficients.

$$\epsilon = E\{|d - Ly_m|^2\} = \{|d - Sw|^2\}$$

$$w = (E[S^*S])^{-1}E[S^*d] = R_{ss}^{-1} r_{sd}$$

$$R_{ss}(i, j) = E\{S_i^* S_j\}$$

$$= E\{n^*G + d^*R)R^iR^j(Rd + G^*N)\}$$

$$= Tr\{R^{i+j+2}\} + N_0 Tr\{R^{i+j+1}\}$$

where $s_i$ is the vector output of the ith stage.

For the purpose of considering the effect of the signal-to-noise ratio (SNR) on the behavior of the C-MMSE $p(\lambda)$, a synchronous, equal power channel is considered. Note that the term SNR is defined herein as the ratio of the received bit energy of a user to the single-sided power spectral density of the background noise, or $E_b/N_0$.

Figure 4:
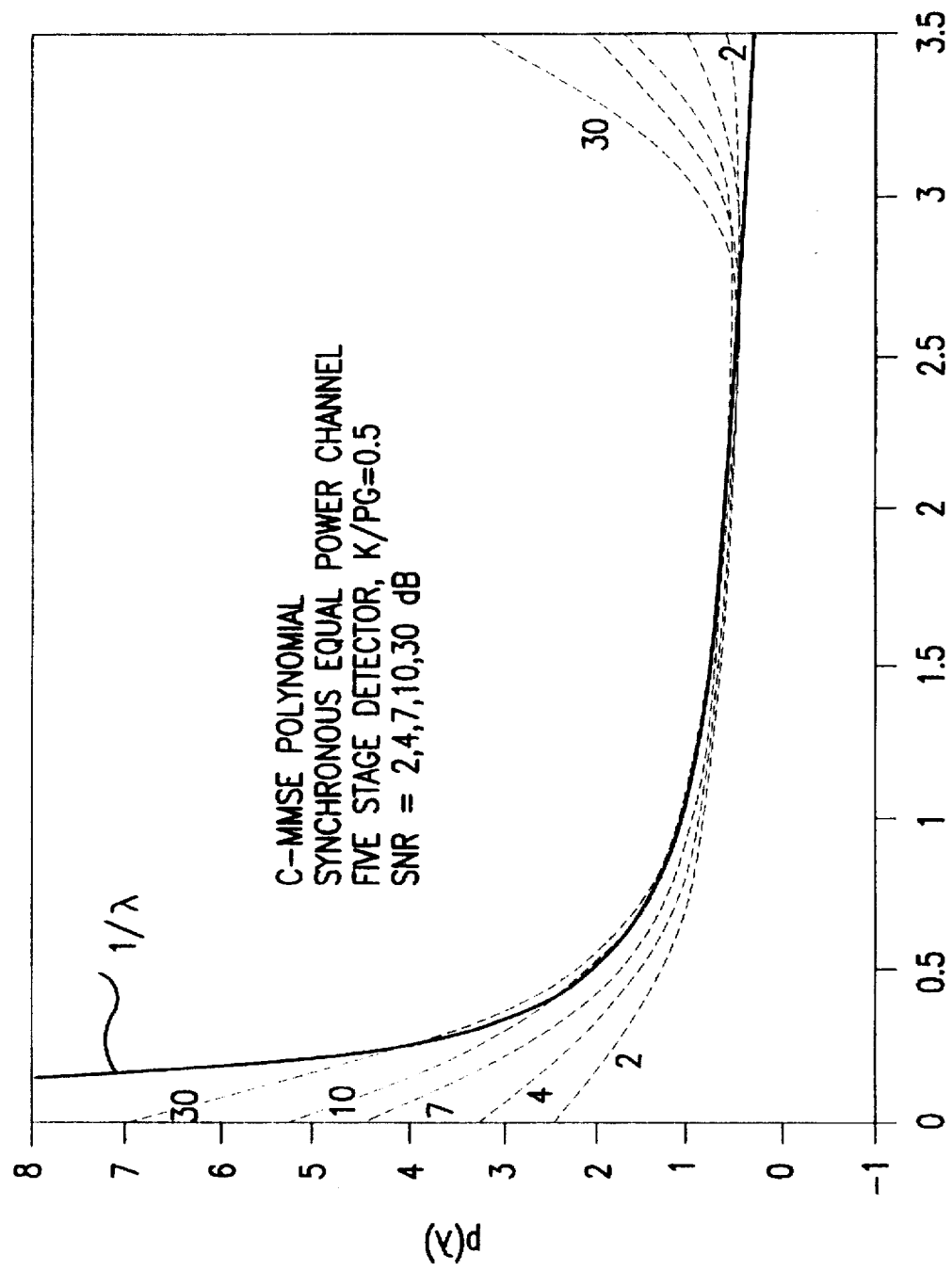
FIG. 4 is a diagram of C-MMSE polynomial curves for a 5 stage C-MMSE detector with signal-to-noise ratios (SNRs) of 2 dB, 4 dB, 7 dB, 10 dB and 30 dB, PG=100, with results shown for a synchronous channel with a system load, K/PG, of 0.5.

FIG. 4 shows the behavior of $p(\lambda)$ that results from a five stage C-MMSE detector with SNR as a parameter. A processing gain of 100, 50 users, and BPSK modulation were used. Here, by definition, the order of $p(\lambda)$ is five.

As shown in FIG. 4, the solid line corresponds to the $1/\lambda$ function, whereas the remaining curves were obtained by using SNRs equal to 2, 4, 7, 10, and 30 dB. The higher the SNR, the steeper the curve. For lower SNRs, $p(\lambda)$ can perform less of an inversion of the small eigenvalues. As the SNR increases, the tolerance for noise enhancement grows, and the curves approach $1/\lambda$ curve, which is optimum at infinite SNR. Comparing these results with the curve for 50 users in FIG. 3, $p(\lambda)$ approximates the $1/(\lambda+N_0/2)$ curve from the following equation, $$p(\lambda_j) = \sum_{i=0}^{N_s} w_i \lambda_j^i = \frac{1}{\lambda_j + N_0/2}$$

only in the region where the eigenvalues of R exist.

The fifth order C-MMSE polynomial does not follow the exact MMSE curve, $1/(\lambda+N_0/2)$, for small $\lambda+N_0/2$. The higher the SNR, the steeper the MMSE curve, and the greater the discrepancy. This reflects the weighting of the approximation errors that is implicit in the C-MMSE algorithm. The weight function, $h(\lambda_j, N_0) = (\lambda_j^2 + N_0\lambda_j)$ gives priority to preserving a good approximation for the region corresponding to the larger eigenvalues. It also decreases the weighting of the approximation errors for small eigenvalues as the noise level decreases. This is reasonable, since the steeper the rise of the $1/(\lambda+N_0/2)$ curve, the more difficult for the fifth order $p(\lambda)$ to approximate the steep region of the curve, without degrading the approximation in other regions.

A computational difficulty arose in determining $p(\lambda)$ from the following equation, $$w = \left\{ \sum_{j=-L}^{L} S^*_j S_j \right\}^{-1} \left\{ \sum_{j=-L}^{L} S^*_j d_j \right\}$$

The inversion computation was ill conditioned for moderate of $N_s$, such as $N_s=5$, due to the monomial basis used in the polynomial expansion.

$$\hat{d} = \sum_{i=0}^{N_s} w_i R^i y_{mf}$$

To get better results for a larger number of stages, a more orthogonal basis is needed. Applying a Laguerre basis, since the eigenvalue distribution at K≈PG resembles an exponential function, the columns of S, which correspond to the terms in the above expansion, were converted to terms in a Laguerre polynomial expansion. The C-MMSE coefficients were then solved for in the Laguerre space, transforming the coefficients back to the monomial space and resulting in a more algorithmically robust method.

Turning to simulation results for both synchronous and asynchronous systems, for the synchronous case, bit, code, and carrier (phase) synchronization are assumed for all user signals, while for an asynchronous channel all signals arrive at the receiver asynchronously. The multistage linear receiver is assumed to make perfect estimates of the timing and phase of each user's signal.

For the simulations presented here, BPSK data modulation is employed, and all signals are assumed to be received at equal power, i.e., ideal power control, with a single signal component per user. The probability of error ($P_e$) performance is sought as a function of system load, which is defined herein as the ratio of the active users to the processing gain. The signal-to-noise ratio (SNR) ($E_b/N_0$) and the "order" of the receiver, i.e., the number of stages used, are considered as parameters. The order zero receiver is simply the conventional DS-CDMA matched filter bank receiver. The C-MMSE coefficients are calculated for each number of users, number of stages, and value of SNR used. The chip-sequence signals, i.e., pseudonoise (PN) signature codes, of each user, are Gold codes of length $2^{13}-1$. The Gold codes were generated from the linear feedback shift register sequences 20033 and 33343 (octal representation).

Figure 5:
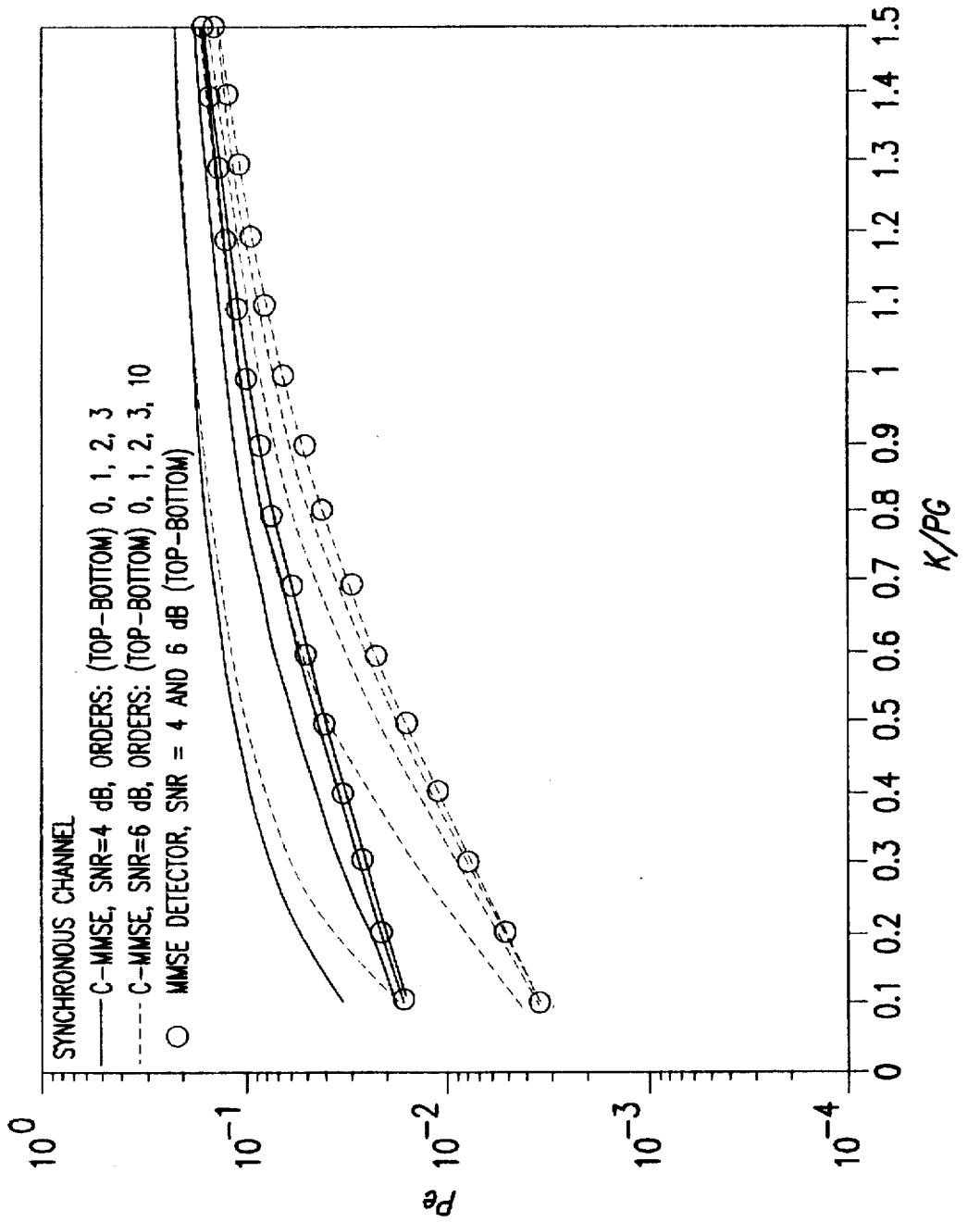
FIG. 5 is a diagram showing probability of error as a function of K/PG for a synchronous channel with SNRs of 4 dB and 6 dB, PG=100, with results shown for C-MMSE detectors of various orders and for the MMSE and conventional (order 0) detectors.
Figure 6:
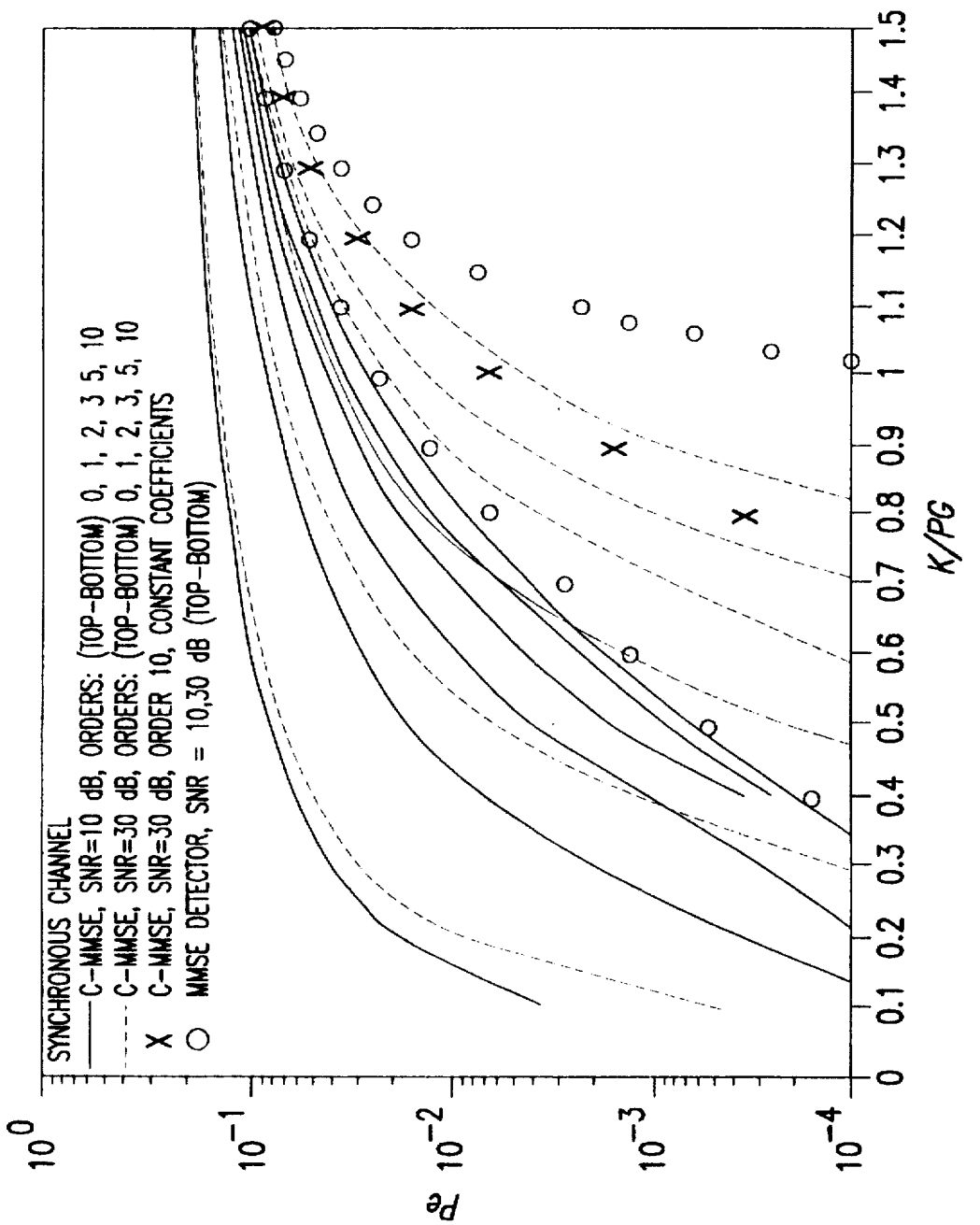
FIG. 6 is a diagram showing probability of error as a function of K/PG for a synchronous channel with SNRs of 10 dB and 30 dB, PG=100, with results shown for C-MMSE detectors of various orders and for the MMSE and conventional (order 0) detectors.

FIGS. 5 and 6 illustrate the performance of both the C-MMSE and exact MMSE detectors for the synchronous channel. The processing gain (PG) was set to 100, and the SNR is taken to be 4 dB, 6 dB, 10 dB, and 30 dB. The improved performance of the C-MMSE detector over the conventional detector is apparent, particularly at high SNR. As expected, with enough stages, the performance of the C-MMSE detector converges to that of the exact MMSE detector. As the SNR level drops, the potential gain from C-MMSE detection is smaller. This is because fewer of the small eigenvalues of R can be inverted without adversely enhancing the thermal noise. In addition, at lower SNRs, fewer stages are needed to reach the MMSE performance limit. This follows because the curve of the equation, $$p(\lambda_j) = \sum_{i=0}^{N_s} w_i \lambda_j^i = \frac{1}{\lambda_j + N_0/2}$$

is flatter at lower SNR levels, and thus a smaller polynomial order will suffice for its approximation.

The line formed by the asterisks in FIG. 6 illustrates a tradeoff that exists in the determination of the weighting coefficients. This curve was generated using coefficients that were optimized for a 10-stage receiver at a SNR of 30 dB, and for a system load K/PG of 1.5. The performance comes close to that achieved by optimizing the coefficients for all user levels. This is because a heavily loaded system results in a cross-correlation matrix with a wide eigenvalue distribution which includes the eigenvalue distribution ranges of less loaded systems. Since a $10^{th}$-order polynomial is able to provide a good approximation of the $1/(\lambda+N_0/2)$ curve for a wide range of eigenvalues, a reasonably good matrix inversion results for the lower user levels. Therefore, increasing the order of the receiver may decrease the need to adapt the weights to the system load.

Figure 7:
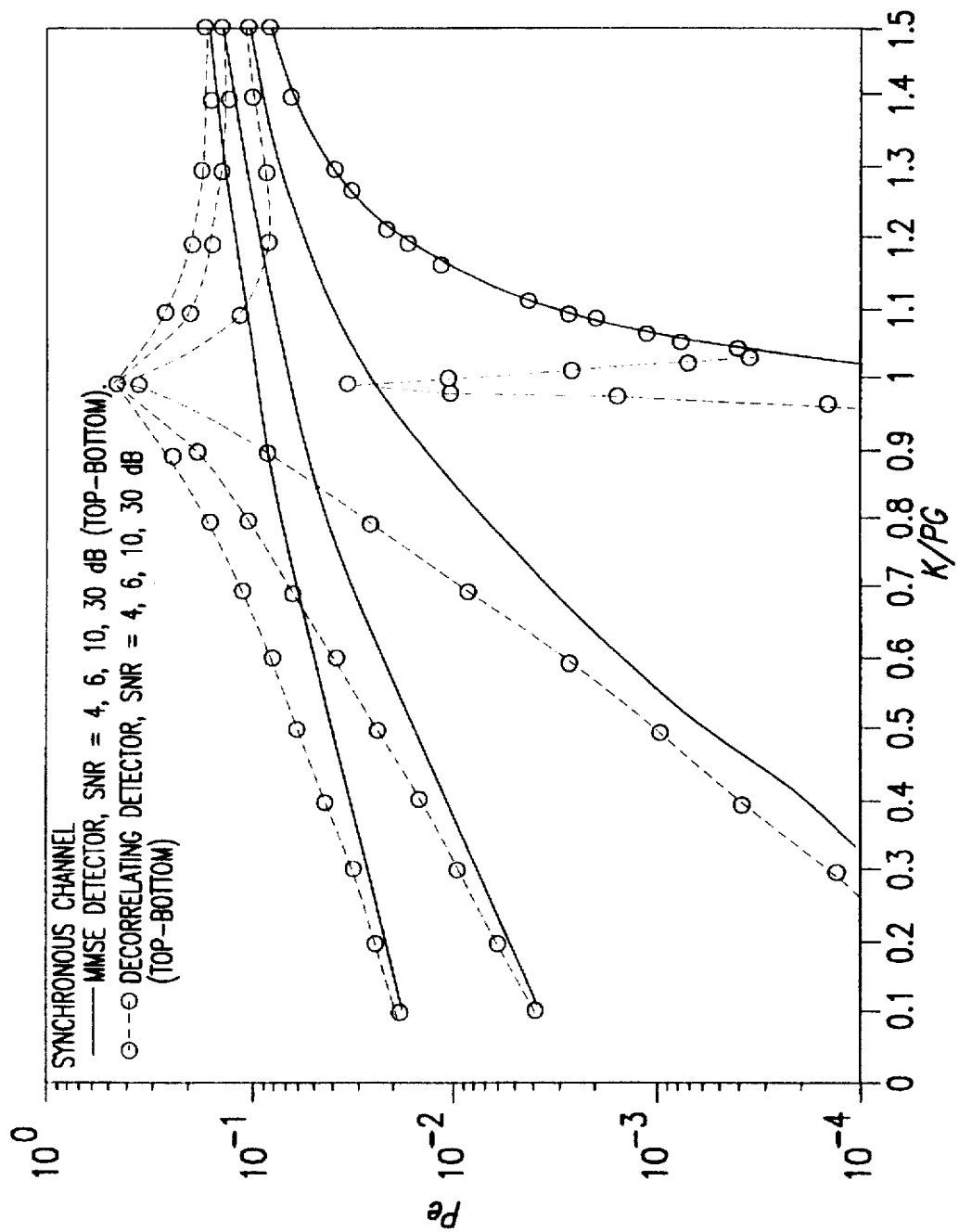
FIG. 7 is a diagram showing probability of error as a function of K/PG for a synchronous channel with SNRs of 4 dB, 6 dB, 10 dB, and 30 dB, with results shown for the decorrelating and MMSE detectors.

A comparison of the performance of the decorrelating detector and the MMSE detector is given in FIG. 7 for a synchronous channel, with a processing gain of 100. As shown, as the number of active users exceeds the processing gain, the performance of the decorrelating detector begins to improve. The reason for this is evident from FIG. 3. The distribution of the nonzero eigenvalues of R for K>PG is shown to shift away from zero. Thus, there is a decrease in the severe noise enhancement that occurs from the inversion of the many small eigenvalues at K=PG. While the eigenvalues that are identically equal to zero cannot be inverted, they do not cause noise enhancement. FIG. 7 also shows the superiority of the MMSE detector over the decorrelating detector for a wide range of user levels. At both very low and very high user levels, there are few nonzero eigenvalues near zero. Thus, in these regions the performances of the two detectors are similar.

Figure 8:
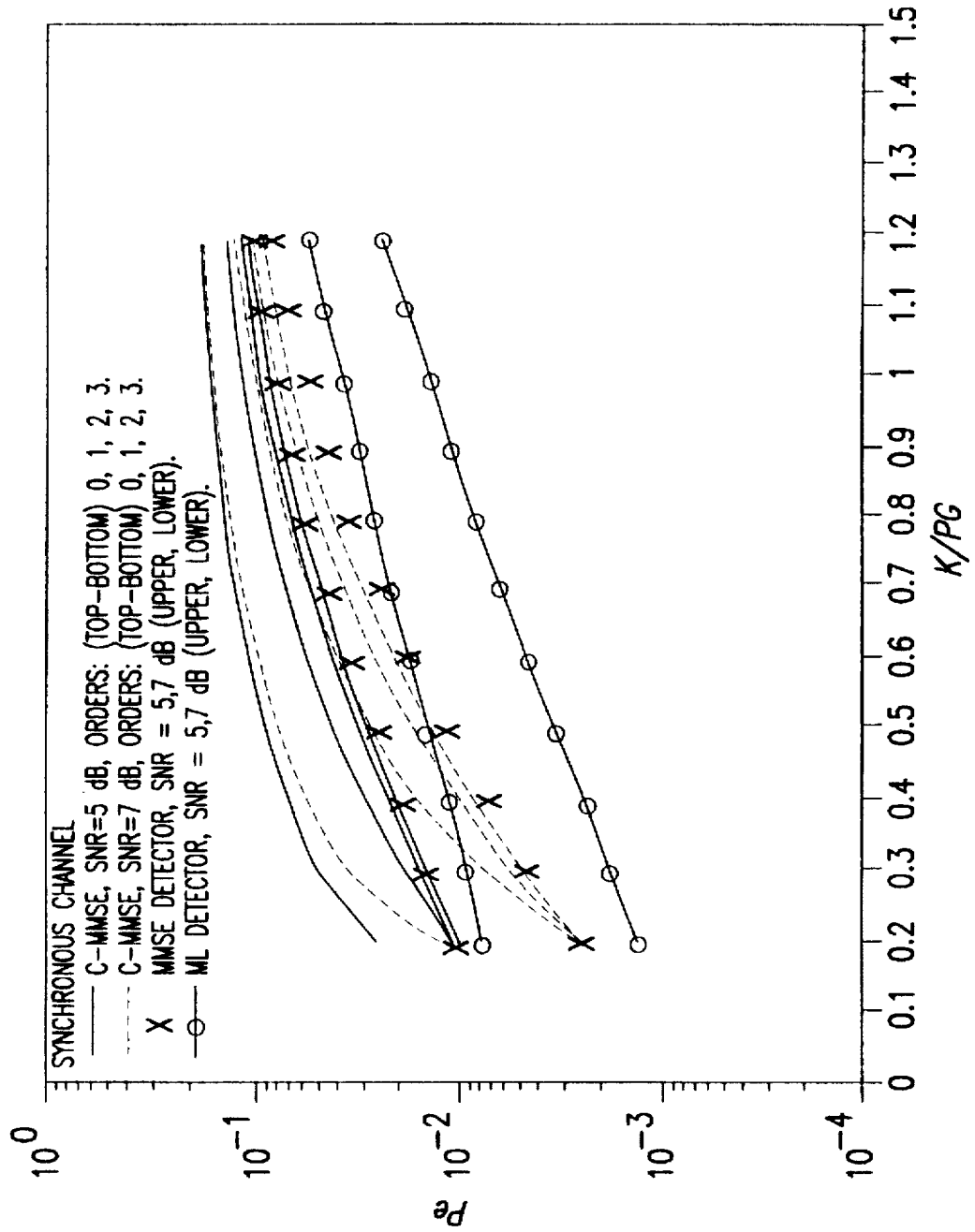
FIG. 8 is a diagram showing probability of error as a function of K/PG for a synchronous channel with SNRs of 5 dB and 7 dB, PG=100, with results shown for C-MMSE detectors of various orders, and for the ML, MMSE, and conventional (order 0) detectors.

FIG. 8 compares the synchronous channel performances of the C-MMSE, MMSE and ML detectors. A small processing gain of 10 and moderate SNR levels of 5 dB and 7 dB are considered in order to facilitate the simulation run time of the ML detector. Although complex to implement, the ML detector yields significant capacity improvement over the MMSE detector.

The performance of the C-MMSE detector is examined for an asynchronous channel. Since the performance of the ML, MMSE, and decorrelating detectors is difficult to obtain for this type of system, the performance of the C-MMSE detector is compared to that of the conventional matched filter detector (order 0). In order to ease the computational load, a processing gain of 25 is used.

Figure 9:
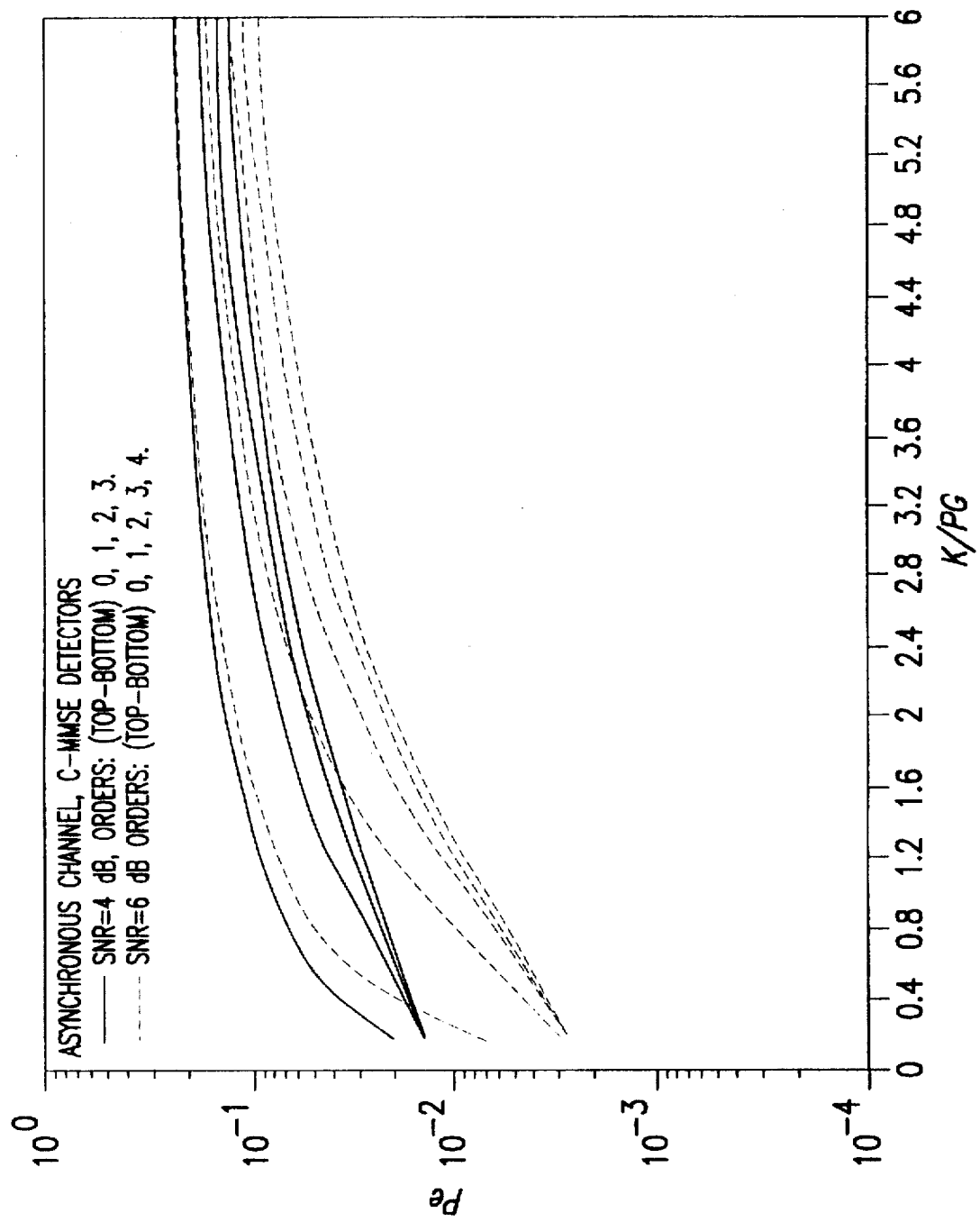
FIG. 9 is a diagram showing probability of error as a function of K/PG for an asynchronous channel with SNRs of 4 dB and 6 dB, PG=100, with results shown for C-MMSE detectors of various orders and the conventional detector (order 0)
Figure 10:
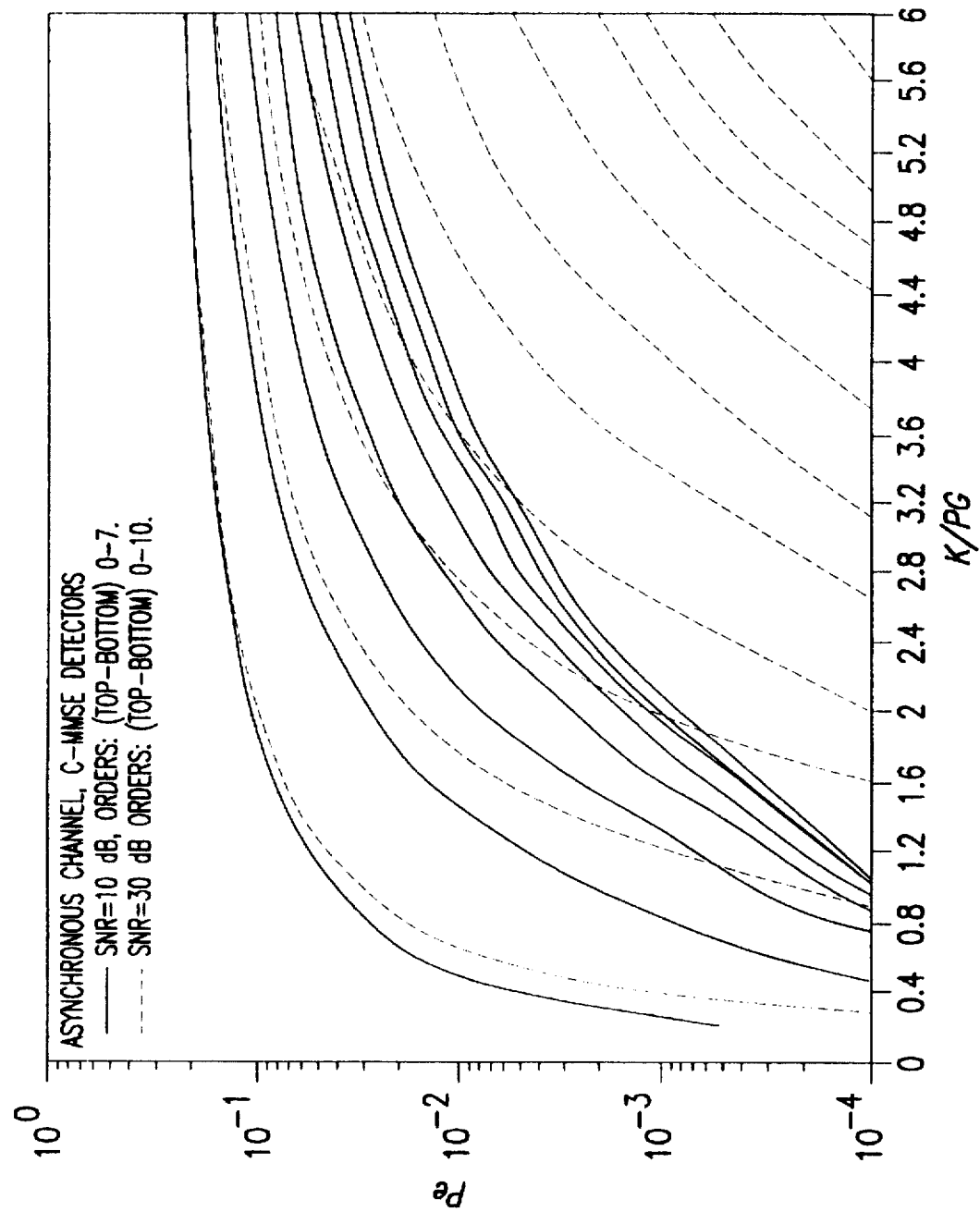
FIG. 10 is a diagram showing probability of error as a function of K/PG for an asynchronous channel with SNRs of 10 dB and 30 dB, with results shown for C-MMSE detectors of various orders and the conventional detector (order 0)

FIGS. 9 and 10 show the performance of C-MMSE detectors of various numbers of stages, and SNRs equal to 4 dB, 6 dB, 10 dB and 30 dB. For high SNRs, very large gains can be achieved with only a small number of stages. Also, under these conditions, low error rates are possible for a number of users many times the processing gain.

In a multicell system environment, a base station might not know the codes of users transmitting in neighboring cells. As a result, the received signals of those users are perceived as background noise. The ratio of the signal power received at a base station from users in neighboring cells to the signal power received from in-cell users is called the spillover ratio. This problem was discussed in A. J. Viterbi, "The Orthogonal-Random Waveform Dichotomy for Digital Mobile Personal Communications," *IEEE Personal Communications* pp. 18–24, First Quarter, 1994, and identified as a significant limiting factor of multiuser interference cancellation schemes. The limit on user capacity gain is given there as (1+f)/f, where f is the spillover ratio. This limit corresponds to a scenario where all in-cell interference is cancelled without any enhancement of the spillover interference.

Figure 11:
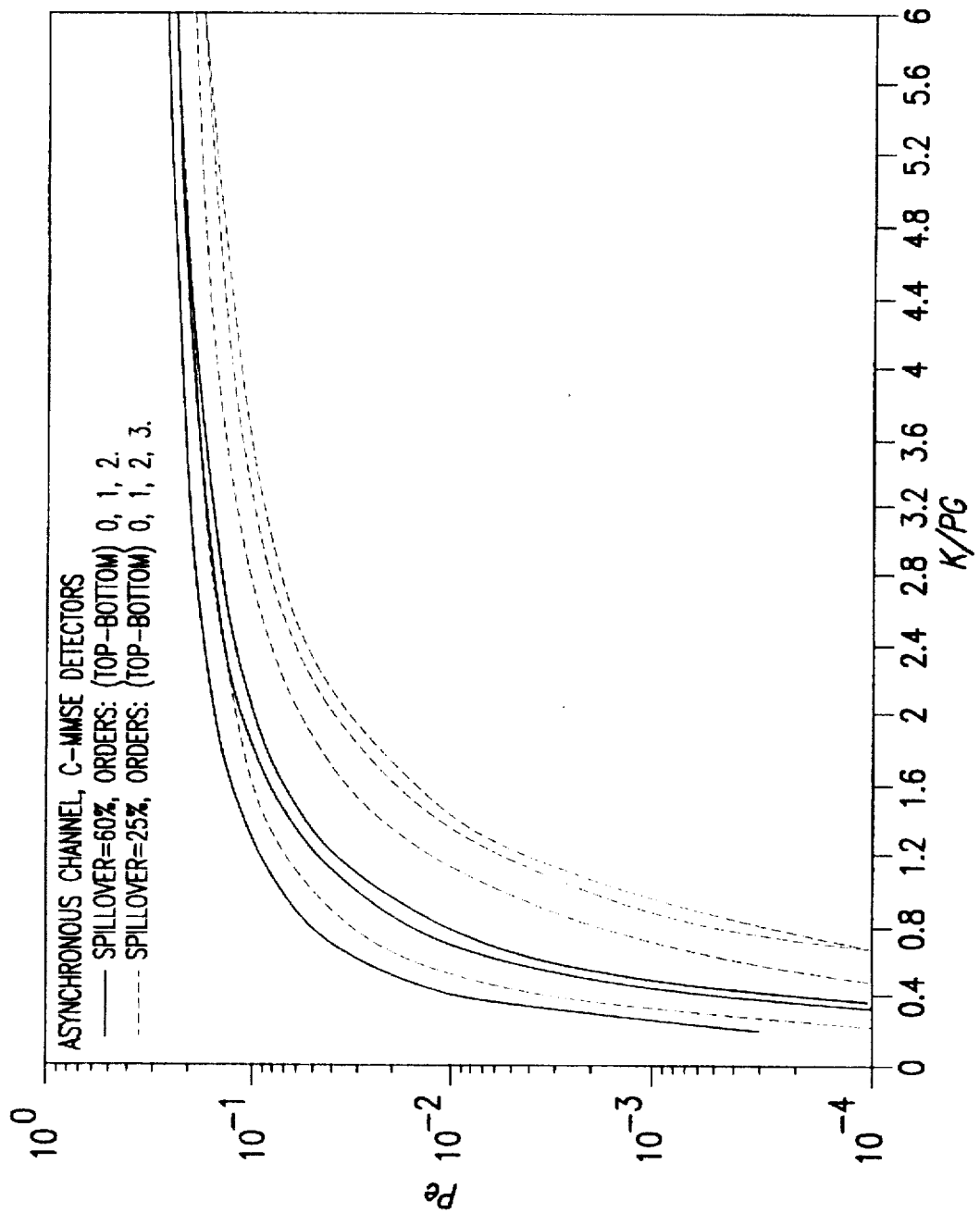
FIG. 11 is a diagram showing probability of error as a function of K/PG for an asynchronous channel with SNR= 30 dB and spillover of 25 and 60 percent, where K refers to in-cell users, with results shown for C-MMSE detectors of various orders and the conventional detector (order 0).

FIG. 11 illustrates the cases of 25% and 60% spillover with a SNR of 30 dB. The spillover energy causes a lowering of the actual SNR operating level, and consequently the C-MMSE detector achieves smaller performance gains. Still, with only two or three stages, the user capacity at a probability of error of $10^{-2}$ improves by factors of about 2 and 3, for spillover ratios of 60% and 25% respectively. This compares well with the ideal limit of (1+f)/f, which limits the maximum gain to factors of about 2.7 and 5. The problem of spillover could be significantly reduced if base stations were supplied with the codes used in their surrounding cells.

In a general multistage linear DS-CDMA receiver structure, each stage recreates the overall modulation, channel (without noise), and demodulation process, which also implements the code cross-correlation matrix R. The proposed receiver structure of the present invention is formed by linearly combining the outputs of the stages. This has the effect of applying a polynomial in R to the matched filter bank outputs. Using a sufficient number of stages, various linear detectors can be implemented by choosing the stage weights to optimize different performance measures. Here, the implementation of the decorrelating and MMSE detectors is considered, and it is seen that the MMSE detector provides a better error rate performance. An approach for computing the stage weighting coefficients that minimize the mean square error is provided, under the constraint that the linear mapping is a polynomial in R. This yields the constrained MMSE or C-MMSE detector. With a sufficient number of stages, the exact (unconstrained) MMSE detector, as well as the exact decorrelating detector, can be realized.

Several system parameters affect on the C-MMSE detector for synchronous and asynchronous channels. At a SNR of 30 dB, simulation results show that the proposed receiver of the present invention, in an asynchronous, BPSK, nonmultipath, equal power channel, can support a number of users many times the processing gain at low error rates. At lower SNRs, smaller, but still significant performance gains are possible. The existence of spillover users from surrounding cells has the effect of causing a decrease in the effective operating SNR. At both high and low SNR operating levels, simulation results indicate that only a small number of stages are needed to realize significant performance gains.

It will be apparent to those skilled in the art that various modifications can be made to the multistage linear receiver of the instant invention without departing from the scope or spirit of the invention, and it is intended that the present invention cover modifications and variations of the multistage linear receiver provided they come within the scope of the appended claims and their equivalents.

We claim:

1. A multistage receiver for extracting data embedded in a received direct sequence code division multiple access (DS-CDMA) spread-spectrum signal having a plurality of channels and a respective plurality of chip-sequence signals, with each channel having a chip-sequence signal different from chip-sequence signals of the other channels of the plurality of channels, said multistage receiver comprising:

despreader-delay means for despreading and delaying the plurality of channels embedded in the received DS-CDMA spread-spectrum signal as a plurality of detector-output signals, respectively;

detector-weighting means, coupled to said despreader-delay means, for weighting the plurality of detector-output signals with a plurality of detector weights to generate a plurality of weighted-detector signals, respectively;

first stage means, coupled to said despreader-delay means, for spread-spectrum processing the plurality of detector-output signals with a replica of the plurality of chip-sequence signals of the plurality of channels, to generate a first plurality of spread-spectrum signals, respectively, for combining the first plurality of spread-spectrum signals as a first combined signal, and for despreading-delaying the first combined signal as a first plurality of despread-combined signals;

first weight means, coupled to said first stage means, for weighting the first plurality of despread-combined signals with a plurality of first weights, respectively, thereby generating a first plurality of weighted signals; and output-combiner means, coupled to said detector-weighting means and to said first weight means, for combining the plurality of weighted-detector signals and the first plurality of weighted signals, respectively, to extract the data.

2. The multistage receiver as set forth in claim 1, wherein said detector-weighting means and said first weight means determine the plurality of detector weights and the plurality of first weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight and a first weight;

$S_j$ is a matrix of the plurality of detector-output signals and the first plurality of despread-combined signals, { }$^{-1}$ indicates an inverse of { } and * indicates complex conjugate transpose; and $d_j$ is a vector of data which generated the plurality of detector-output signals and the first plurality of despread-combined signals.

3. The multistage receiver as set forth in claim 1, further comprising:

second stage means, coupled to said first stage means, for spread-spectrum processing the first plurality of despread-combined signals with the replica of the plurality of chip-sequence signals of the plurality of channels, to generate a second plurality of spread-spectrum signals, respectively, for combining the second plurality of spread-spectrum signals as a second combined signal, and for despreading-delaying the second combined signal as a second plurality of despread-combined signals;

second weight means, coupled to said second stage means, for weighting the second plurality of despread-combined signals with a plurality of second weights, thereby generating a second plurality of weighted signals, respectively; and said output-combiner means, coupled to said second weight means, for combining the plurality of weighted-detector signals, the first plurality of weighted signals and the second plurality of weighted signals, respectively, to extract the data.

4. The multistage receiver as set forth in claim 3, wherein said detector-weighting means, said first weight means, and said second weight means determine the plurality of detector weights, the plurality of first weights and the plurality of second weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight and a second weight;

$S_j$ is a matrix of the plurality of detector-output signals, the first plurality of despread-combined signals and the second plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals and the second plurality of despread-combined signals.

5. The multistage receiver as set forth in claim 3, further comprising:

third stage means, coupled to said second stage means, for spread-spectrum processing the second plurality of despread-combined signals with the replica of the plurality of chip-sequence signals of the plurality of channels, to generate a third plurality of spread-spectrum signals, respectively, for combining the third plurality of spread-spectrum signals as a third combined signal, and for despreading-delaying the third combined signal as a third plurality of despread-combined signals;

third weight means, coupled to said third stage means, for weighting the third plurality of despread-combined signals with a plurality of third weights, thereby generating a third plurality of weighted signals, respectively; and said output-combiner means, coupled to said third weight means, for combining the plurality of weighted-detector signals, the first plurality of weighted signals, the second plurality of weighted signals, and the third plurality of weighted signals, respectively, to extract the data.

6. The multistage receiver as set forth in claim 5, wherein said detector-weighting means, said first weight means, said second weight means, and said third weight means determine the plurality of detector weights, the plurality of first weights, the plurality of second weights and the plurality of third weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight and a third weight;

$S_j$ is a matrix of the plurality of detector-output signals, the first plurality of despread-combined signals, the second plurality of despread-combined signals and the third plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals, the second plurality of despread-combined signals and the third plurality of despread-combined signals.

7. The multistage receiver as set forth in claim 5, further comprising:

fourth stage means, coupled to said third stage means, for spread-spectrum processing the third plurality of despread-combined signals with the replica of the plurality of chip-sequence signals of the plurality of channels, to generate a fourth plurality of spread-spectrum signals, respectively, for combining the fourth plurality of spread-spectrum signals as a fourth combined signal, and for despreading-delaying the fourth combined signal as a fourth plurality of despread-combined signals;

fourth weight means, coupled to said fourth stage means, for weighting the fourth plurality of despread-combined signals with a plurality of fourth weights, thereby generating a fourth plurality of weighted signals, respectively; and said output-combiner means, coupled to said fourth weight means, for combining the plurality of weighted-detector signals, the first plurality of weighted signals, the second plurality of weighted signals, the third plurality of weighted signals and the fourth plurality of weighted signals, respectively, to extract the data.

8. The multistage receiver as set forth in claim 7, wherein said detector weighting means, said first weight means, said second weight means, said third weight means, and said fourth weight means determine the plurality of detector weights, the plurality of first weights, the plurality of second weights, the plurality of third weights and the plurality of fourth weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight, a third weight and a fourth weight;

$S_j$ is a matrix of the plurality of detector-output signals, the first plurality of despread-combined signals, the second plurality of despread-combined signals, the third plurality of despread-combined signals and the fourth plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals, the second plurality of despread-combined signals, the third plurality of despread-combined signals and the fourth plurality of despread-combined signals.

9. The multistage receiver as set forth in claim 7, further comprising:

fifth stage means, coupled to said fourth stage means, for spread-spectrum processing the fourth plurality of despread-combined signals with the replica of the plurality of chip-sequence signals of the plurality of channels to generate a fifth plurality of spread-spectrum signals, for combining the fifth plurality of spread-spectrum signals as a fifth combined signal, and for despreading-delaying the fifth combined signal as a fifth plurality of despread-combined signals, respectively;

fifth weight means, coupled to said fifth stage means, for weighting the fifth plurality of despread-combined signals with a plurality of fifth weights, thereby generating a fifth plurality of weighted signals, respectively; and said output-combiner means, coupled to said fifth weight means, for combining the plurality of weighted-detector signals, the first plurality of weighted signals, the second plurality of weighted signals, the third plurality of weighted signals, the fourth plurality of weighted signals and the fifth plurality of weighted signals, respectively, to extract the data.

10. The multistage receiver as set forth in claim 9, wherein said detector weighting means, said first weight means, said second weight means, said third weight means, said fourth weight means, and said fifth weight means determine the plurality of detector weights, the plurality of first weights, the plurality of second weights, the plurality of third weights, the plurality of fourth weights and the plurality of fifth weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight, a third weight, a fourth weight and a fifth weight;

$S_j$ is a matrix of the plurality of detector-output signals, the first plurality of despread-combined signals, the second plurality of despread-combined signals, the third plurality of despread-combined signals, the fourth plurality of despread-combined signals and the fifth plurality of despread-combined signals, $\{\ \}^{-1}$ indicates an inverse of $\{\ \}$ and * indicates complex conjugate transpose;

$d_j$ is a vector of data which generated the plurality of detector-output signals, the first plurality of despread-combined signals, the second plurality of despread-combined signals, the third plurality of despread-combined signals, the fourth plurality of despread-combined signals and the fifth plurality of despread-combined signals.

11. A multistage receiver for extracting data embedded in a received direct sequence code division multiple access (DS-CDMA) spread-spectrum signal having a plurality of channels, with each channel having a chip-sequence signals different from chip-sequence signals of the other channels of the plurality of channels, said multistage receiver comprising:

an initial plurality of spread-spectrum detectors for despreading-delaying the plurality of channels embedded in the received DS-CDMA spread-spectrum signal as a plurality of detector-output signals, respectively;

detector-weighting means, coupled to said initial plurality of spread-spectrum detectors, for weighting the plurality of detector-output signals with a plurality of detector weights to generate a plurality of weighted-detector signals, respectively;

a first plurality of product devices, coupled to said initial plurality of spread-spectrum detectors, for spread-spectrum processing the plurality of detector-output signals with the plurality of chip-sequence signals of the plurality of channels, to generate a first plurality of spread-spectrum signals, respectively;

a first combiner, coupled to said first plurality of product devices, for combining the first plurality of spread-spectrum signals as a first combined signal; and a first plurality of spread-spectrum detectors, coupled to said first combiner, for despreading-delaying the first combined signal as a first plurality of despread-combined signals;

first weight means, coupled to said first plurality of spread-spectrum detectors, for weighting the first plurality of despread-combined signals with a plurality of first weights to generate a first plurality of weighted signals, respectively; and an output combiner, coupled to said detector-weighting means and to said first weight means, for combining the plurality of weighted-detector signals and the first plurality of weighted signals, respectively, to extract the data.

12. The multistage receiver as set forth in claim 11, wherein said detector-weighting means and said first weight means determine the plurality of detector weights and the plurality of first weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight and a first weight;

$S_j$ is a matrix of the plurality of detector-output signals and the first plurality of despread-combined signals, $\{\ \}^{-1}$ indicates an inverse of $\{\ \}$ and * indicates complex conjugate transpose; and $d_j$ is a vector of data which generated the plurality of detector-output signals and the first plurality of despread-combined s5.

13. The multistage receiver as set forth in claim 11, further comprising:

a second plurality of product devices, coupled to said first plurality of spread-spectrum detectors, for spread-spectrum processing the first plurality of despread-combined signals with the plurality of chip-sequence signals of the plurality of channels, to generate a second plurality of spread-spectrum signals, respectively;

a second combiner, coupled to said second plurality of product devices, for combining the second plurality of spread-spectrum signals as a second combined signal;

a second plurality of spread-spectrum detectors, coupled to said second combiner, for despreading-delaying the second combined signal as a second plurality of despread-combined signals;

second weight means, coupled to said second plurality of spread-spectrum detectors, for weighting the second plurality of despread-combined signals with a plurality of second weights, thereby generating a second plurality of weighted signals, respectively; and said output combiner, coupled to said second weight means, for combining the plurality of weighted-detector signals, the first plurality of weighted signals and the second plurality of weighted signals, respectively, to extract the data.

14. The multistage receiver as set forth in claim 13, wherein said detector-weighting means, said first weight means and said second weight means determine the plurality of detector weights, the plurality of first weights and the plurality of second weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight and a second weight;

$S_j$ is a matrix of the plurality of detector-output signals, the first plurality of despread-combined signals and the second plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals and the second plurality of despread-combined signals.

15. The multistage receiver as set forth in claim 13, further comprising:

a third plurality of product devices, coupled to said second plurality of spread-spectrum detectors, for spread-spectrum processing the second plurality of despread-combined signals with the plurality of chip-sequence signals of the plurality of channels, to generate a third plurality of spread-spectrum signals, respectively;

a third combiner, coupled to said third plurality of product devices, for combining the third plurality of spread-spectrum signals as a third combined signal;

a third plurality of spread-spectrum detectors, coupled to said third combiner, for despreading-delaying the third combined signal as a third plurality of despread-combined signals;

third weight means, coupled to said third plurality of spread-spectrum detectors, for weighting the third plurality of despread-combined signals with a plurality of third weights, thereby generating a third plurality of weighted signals, respectively; and said output combiner, coupled to said third weight means, for combining the plurality of weighted-detector signals, the first plurality of weighted signals, the second plurality of weighted signals, and the third plurality of weighted signals, respectively, to extract the data.

16. The multistage receiver as set forth in claim 15, wherein said detector-weighting means, said first weight means, said second weight means, and said third weight means determine the plurality of detector weights, the plurality of first weights, the plurality of second weights and the plurality of third weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight and a third weight;

$S_j$ is a matrix of the plurality of detector-output signals, the first plurality of despread-combined signals, the second plurality of despread-combined signals and the third plurality of despread-combined signals, respectively, $\{\ \}^{-1}$ indicates an inverse of $\{\ \}$ and * indicates complex conjugate transpose; and $d_j$ is a vector of data which generated the plurality of detector-output signals, the first plurality of despread-combined signals, the second plurality of despread-combined signals and the third plurality of despread-combined signals, respectively.

17. The multistage receiver as set forth in claim 15, further comprising:

a fourth plurality of product devices, coupled to said third plurality of spread-spectrum detectors, for spread-spectrum processing the third plurality of despread-combined signals with the plurality of chip-sequence signals of the plurality of channels, to generate a fourth plurality of spread-spectrum signals, respectively;

a fourth combiner, coupled to said fourth plurality of product devices, for combining the fourth plurality of spread-spectrum signals as a fourth combined signal;

a fourth plurality of spread-spectrum detectors, coupled to said fourth combiner, for despreading-delaying the fourth combined signal as a fourth plurality of despread-combined signals;

fourth weight means, coupled to said fourth plurality of spread-spectrum detectors, for weighting the fourth plurality of despread-combined signals with a plurality of fourth weights, thereby generating a fourth plurality of weighted signals, respectively; and said output combiner, coupled to said fourth weight means, for combining the plurality of weighted-detector signals, the first plurality of weighted signals, the second plurality of weighted signals, the third plurality of weighted signals and the fourth plurality of weighted signals, respectively, to extract the data.

18. The multistage receiver as set forth in claim 17, wherein said detector weighting means, said first weight means, said second weight means, said third weight means, and said fourth weight means determines the plurality of detector weights, the plurality of first weights, the plurality of second weights, the plurality of third weights and the plurality of fourth weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight, a third weight and a fourth weight;

$S_j$ is a matrix of the plurality of detector-output signals, the first plurality of despread-combined signals, the second plurality of despread-combined signals, the third plurality of despread-combined signals and the fourth plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals, the second plurality of despread-combined signals, the third plurality of despread-combined signals and the fourth plurality of despread-combined signals.

19. The multistage receiver as set forth in claim 17, further comprising:

a fifth plurality of product devices, coupled to said fourth plurality of spread-spectrum detectors, for spread-spectrum processing the fourth plurality of despread-combined signals with the plurality of chip-sequence signals of the plurality of channels to generate a fifth plurality of spread-spectrum signals;

a fifth combiner, coupled to said fifth plurality of product devices, for combining the fifth plurality of spread-spectrum signals as a fifth combined signal;

a fifth plurality of spread-spectrum detectors, coupled to said fifth combiner, for despreading-delaying the fifth combined signal as a fifth plurality of despread-combined signals, respectively;

fifth weight means, coupled to said fifth plurality of spread-spectrum detectors, for weighting the fifth plurality of despread-combined signals with a plurality of fifth weights, thereby generating a fifth plurality of weighted signals, respectively; and said output combiner, coupled to said fifth weight means, for combining the plurality of weighted-detector signals, the first plurality of weighted signals, the second plurality of weighted signals, the third plurality of weighted signals, the fourth plurality of weighted signals and the fifth plurality of weighted signals, respectively, to extract the data.

20. The multistage receiver as set forth in claim 19, wherein said detector weighting means, said first weight means, said second weight means, said third weight means, said fourth weight means, and said fifth weight means determine the plurality of detector weights, the plurality of first weights, the plurality of second weights, the plurality of third weights, the plurality of fourth weights and the plurality of fifth weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight, a third weight, a fourth weight and a fifth weight;

$S_j$ is a matrix of the plurality of detector-output signals, the first plurality of despread-combined signals, the second plurality of despread-combined signals, the third plurality of despread-combined signals, the fourth plurality of despread-combined signals and the fifth plurality of despread-combined signals, $\{\ \}^{-1}$ indicates an inverse of $\{\ \}$ and * indicates complex conjugate transpose;

$d_j$ is a vector of data which generated the plurality of detector-output signals, the first plurality of despread-combined signals, the second plurality of despread-combined signals, the third plurality of despread-combined signals, the fourth plurality of despread-combined signals and the fifth plurality of despread-combined signals.

21. A method for extracting data embedded in a received direct sequence code division multiple access (DS-CDMA) spread-spectrum signal having a plurality of channels with each channel having a chip-sequence signal of a plurality of chip-sequence signals different from chip-sequence signals of the other channels of the plurality of channels, the method comprising the steps of:

despreading the plurality of channels embedded in the received DS-CDMA spread-spectrum signal as a plurality of detector-output signals, respectively;

weighting the plurality of detector-output signals with a plurality of detector weights to generate a plurality of weighted-detector signals, respectively;

spread-spectrum processing the plurality of detector-output signals with the plurality of chip-sequence signals of the plurality of channels, as a first plurality of spread-spectrum signals, respectively;

combining the first plurality of spread-spectrum signals as a first combined signal;

despreading-delaying the first combined signal as a first plurality of despread-combined signals;

weighting the first plurality of despread-combined signals with a plurality of first weights thereby generating a first plurality of weighted signals, respectively; and combining the plurality of weighted-detector signals and the first plurality of weighted signals, respectively, to extract the data.

22. The method as set forth in claim 21, wherein the steps of weighting have the plurality of detector weights and the plurality of first weights determined from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight and a first weight;

$S_j$ is a matrix of the plurality of detector-output signals and the first plurality of despread-combined signals, $\{\ \}^{-1}$ indicates an inverse of $\{\ \}$ and * indicates complex conjugate transpose; and $d_j$ is a vector of data which generated the plurality of detector-output signals and the first plurality of despread-combined signals.

23. The method as set forth in claim 21, further comprising the steps of:

spread-spectrum processing the first plurality of despread-combined signals with the plurality of chip-sequence signals of the plurality of channels, to generate a second plurality of spread-spectrum signals, respectively;

combining the second plurality of spread-spectrum signals as a second combined signal;

despreading-delaying the second combined signal as a second plurality of despread-combined signals;

weighting the second plurality of despread-combined signals with a plurality of second weights, thereby generating a second plurality of weighted signals, respectively; and combining the plurality of weighted-detector signals, the first plurality of weighted signals and the second plurality of weighted signals, respectively, to extract the data.

24. The method as set forth in claim 23, wherein the steps of weighting have the plurality of detector weights, the plurality of first weights and the plurality of second weights determined from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight and a second weight;

$S_j$ is a matrix of the plurality of detector-output signals, the first plurality of despread-combined signals and the second plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals and the second plurality of despread-combined signals.

25. The method as set forth in claim 23, further comprising the steps of:

spread-spectrum processing the second plurality of despread-combined signals with the plurality of chip-sequence signals of the plurality of channels, to generate a third plurality of spread-spectrum signals, respectively;

combining the third plurality of spread-spectrum signals as a third combined signal;

despreading-delaying the third combined signal as a third plurality of despread-combined signals;

weighting the third plurality of despread-combined signals with a plurality of third weights, thereby generating a third plurality of weighted signals, respectively; and combining the plurality of weighted-detector signals, the first plurality of weighted signals, the second plurality of weighted signals, and the third plurality of weighted signals, respectively, to extract the data.

26. The method as set forth in claim 25, wherein the steps of weighting have the plurality of detector weights, the plurality of first weights, the plurality of second weights and the plurality of third weights determined from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight and a third weight;

$S_j$ is a matrix of the plurality of detector-output signals, the first plurality of despread-combined signals, the second plurality of despread-combined signals and the third plurality of despread-combined signals, respectively, $\{\ \}^{-1}$ indicates an inverse of $\{\ \}$ and * indicates complex conjugate transpose; and $d_j$ is a vector of data which generated the plurality of detector-output signals, the first plurality of despread-combined signals, the second plurality of despread-combined signals and the third plurality of despread-combined signals.

27. The method as set forth in claim 25, further comprising the steps of:

spread-spectrum processing the third plurality of despread-combined signals with the plurality of chip-sequence signals of the plurality of channels, to generate a fourth plurality of spread-spectrum signals, respectively;

combining the fourth plurality of spread-spectrum signals as a fourth combined signal;

despreading-delaying the fourth combined signal as a fourth plurality of despread-combined signals;

weighting the fourth plurality of despread-combined signals with a plurality of fourth weights, thereby generating a fourth plurality of weighted signals, respectively; and combining the plurality of weighted-detector signals, the first plurality of weighted signals, the second plurality of weighted signals, the third plurality of weighted signals and the fourth plurality of weighted signals, respectively, to extract the data.

28. The method as set forth in claim 27, wherein the steps of weighting have the plurality of detector weights, the plurality of first weights, the plurality of second weights, the plurality of third weights and the plurality of fourth weights determined from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight, a third weight and a fourth weight;

$S_j$ is a matrix of the plurality of detector-output signals, the first plurality of despread-combined signals, the second plurality of despread-combined signals, the third plurality of despread-combined signals and the fourth plurality of despread-combined signals, $\{\ \}^{-1}$ indicates an inverse of $\{\ \}$ and * indicates complex conjugate transpose; and $d_j$ is a vector of data which generated the plurality of detector-output signals, the first plurality of despread-combined signals, the second plurality of despread-combined signals, the third plurality of despread-combined signals and the fourth plurality of despread-combined signals.

29. The method as set forth in claim 27, further comprising the steps of:

spread-spectrum processing the fourth plurality of despread-combined signals with the plurality of chip-sequence signals of the plurality of channels to generate a fifth plurality of spread-spectrum signals;

combining the fifth plurality of spread-spectrum signals as a fifth combined signal;

despreading-delaying the fifth combined signal as a fifth plurality of despread-combined signals, respectively;

weighting the fifth plurality of despread-combined signals with a plurality of fifth weights, thereby generating a fifth plurality of weighted signals, respectively; and combining the plurality of weighted-detector signals, the first plurality of weighted signals, the second plurality of weighted signals, the third plurality of weighted signals, the fourth plurality of weighted signals and the fifth plurality of weighted signals, respectively, to extract the data.

30. The method as set forth in claim 29, wherein the steps of weighting have the plurality of detector weights, the plurality of first weights, the plurality of second weights, the plurality of third weights, the plurality of fourth weights and the plurality of fifth weights determined from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight, a first weight, a second weight, a third weight, a fourth weight and a fifth weight;

$S_j$ is a matrix of the plurality of detector-output signals, the first plurality of despread-combined signals, the second plurality of despread-combined signals, the third plurality of despread-combined signals, the fourth plurality of despread-combined signals and the fifth plurality of despread-combined signals, $\{\ \}^{-1}$ indicates an inverse of $\{\ \}$ and * indicates complex conjugate transpose;

$d_j$ is a vector of data which generated the plurality of detector-output signals, the first plurality of despread-combined signals, the second plurality of despread-combined signals, the third plurality of despread-combined signals, the fourth plurality of despread-combined signals and the fifth plurality of despread-combined signals.

31. A multistage receiver for extracting data embedded in a received direct sequence code division multiple access (DS CDMA) spread-spectrum signal having a plurality of channels with each channel having a chip-sequence signal different from chip-sequence signals of the other of the plurality of channels, said multistage receiver comprising:

despreader means for despreading-delaying the plurality of channels embedded in the received DS CDMA spread-spectrum signal, thereby generating a plurality of detector-output signals, respectively;

detector-weighting means, coupled to said despreader means, for weighting each of the plurality of detector-output signals with a plurality of detector weights to generate a plurality of weighted-detector signals;

a plurality of stages with a first stage of said plurality of stages coupled to said despreader means and with a plurality of successive stages of said plurality of stages successively coupled to a next stage, each of said plurality of stages including, first means for spread-spectrum processing a plurality of input signals to said stage to generate a plurality of spread-spectrum signals, for combining the plurality of spread-spectrum signals as a combined signal, and for despreading-delaying the combined signal as a plurality of despread-combined signals, respectively;

second means, coupled to said first means, for weighting the plurality of despread-combined signals with a plurality of weights, thereby generating a plurality of weighted signals, respectively; and output-combiner means, coupled to said detector weighting means and to each second means of said plurality of stages, for combining the plurality of weighted-detector signals and the plurality of weighted signals from each stage of said plurality of stages, to extract the data.

32. The multistage receiver as set forth in claim 31, wherein said detector-weighting means and each second means of said plurality of stages determine the plurality of detector-weights and the plurality of weights, respectively, from an algorithm:

$$w = \left\{ \sum_{j=-L}^{L} S^*_j S_j \right\}^{-1} \left\{ \sum_{j=-L}^{L} S^*_j d_j \right\}$$

where w is a vector of a detector weight and a weight of each stage;

$S_j$ is a matrix of the plurality of detector-output signals and the plurality of despread-combined signals of each stage, $\{\ \}^{-1}$ indicates an inverse of $\{\ \}$ and * indicates complex conjugate transpose; and $d_j$ is a vector of data which generated the plurality of detector-output signals and the plurality of despread-combined signals from each stage.

* * * * *